US006913091B2

(12) United States Patent
Wentworth et al.

(10) Patent No.: US 6,913,091 B2
(45) Date of Patent: Jul. 5, 2005

(54) METHOD AND APPARATUS FOR REPLACEMENT OF UNDERGROUND PIPE

(75) Inventors: Steven W. Wentworth, Brookfield, WI (US); Mark D. Randa, Summit, WI (US); Robert F. Crane, Oconomowoc, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 74 days.

(21) Appl. No.: 10/342,137

(22) Filed: Jan. 14, 2003

(65) Prior Publication Data

US 2003/0165360 A1 Sep. 4, 2003

Related U.S. Application Data

(60) Provisional application No. 60/348,824, filed on Jan. 14, 2002.

(51) Int. Cl.$^7$ .................................................. B25D 9/04
(52) U.S. Cl. ...................................... 173/128; 173/206
(58) Field of Search ......................... 173/206, 91, 112, 173/90, 128; 175/53, 296; 405/184.3, 184.1

(56) References Cited

U.S. PATENT DOCUMENTS

| | | | | |
|---|---|---|---|---|
| 4,024,721 A | | 5/1977 | Takada et al. ............... 61/72.7 |
| 4,333,537 A | * | 6/1982 | Harris et al. ................. 173/17 |
| 4,505,302 A | | 3/1985 | Streatfield et al. ............ 138/97 |
| 4,507,019 A | * | 3/1985 | Thompson ............... 405/184.3 |
| 4,720,211 A | | 1/1988 | Streatfield et al. .......... 405/154 |
| 4,738,565 A | | 4/1988 | Streatfield et al. .......... 405/154 |
| 4,983,071 A | | 1/1991 | Fisk et al. .................. 405/154 |
| 5,025,868 A | | 6/1991 | Wentworth et al. ........... 173/91 |
| 5,078,546 A | | 1/1992 | Fisk et al. .................. 405/156 |
| 5,098,225 A | | 3/1992 | Rockower et al. .......... 405/156 |
| 5,171,106 A | | 12/1992 | Rockower et al. .......... 405/156 |
| 5,465,797 A | * | 11/1995 | Wentworth et al. ........... 173/91 |
| 5,494,116 A | * | 2/1996 | Wentworth .................. 173/17 |
| RE35,542 E | | 6/1997 | Fisk et al. .................. 405/156 |
| 5,749,677 A | * | 5/1998 | Grigoraschenko et al. .. 405/184 |
| 5,782,311 A | | 7/1998 | Wentworth .................. 175/53 |
| 6,269,889 B1 | | 8/2001 | Wentworth .................. 173/91 |
| 6,305,880 B1 | | 10/2001 | Carter et al. ............. 405/184.3 |

FOREIGN PATENT DOCUMENTS

WO   WO 98/30350   7/1998   ........... B23D/21/06

* cited by examiner

Primary Examiner—Michael Safavi
(74) Attorney, Agent, or Firm—Philip G. Meyers

(57) ABSTRACT

An impactor for use with a directional boring machine for replacement of underground pipes includes a bursting head having a rearwardly opening recess and a front end opening that communicates with the recess. An inlet pipe is connected at its front end to a distal end of the drill string and extends into the recess of the bursting head through the front end opening. A striker is mounted for sliding movement along the inlet pipe, and a distributing mechanism responsive to pressure fluid supplied through the drill string and inlet pipe causes the striker to reciprocate in the rearwardly opening recess of the head to deliver forward impacts against the bursting head. The striker and distributing mechanism are mounted in a tubular housing, and a pulling connection is provided by which the impactor can be pulled by the drill string while the striker is delivering impacts against the head in the same direction as a pulling force exerted by the drill string. The bursting head is preferably slidably mounted on the inlet pipe and moves forward relative to the inlet pipe and drill string in response to an impact of the striker against the bursting head. The impactor can be readily used with existing directional boring machines.

12 Claims, 15 Drawing Sheets

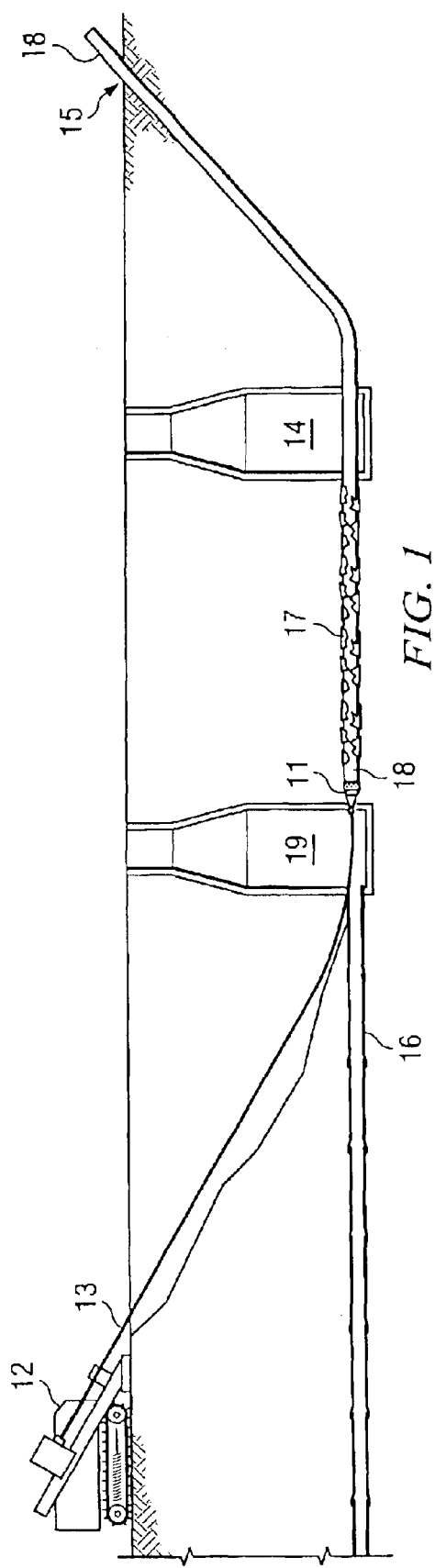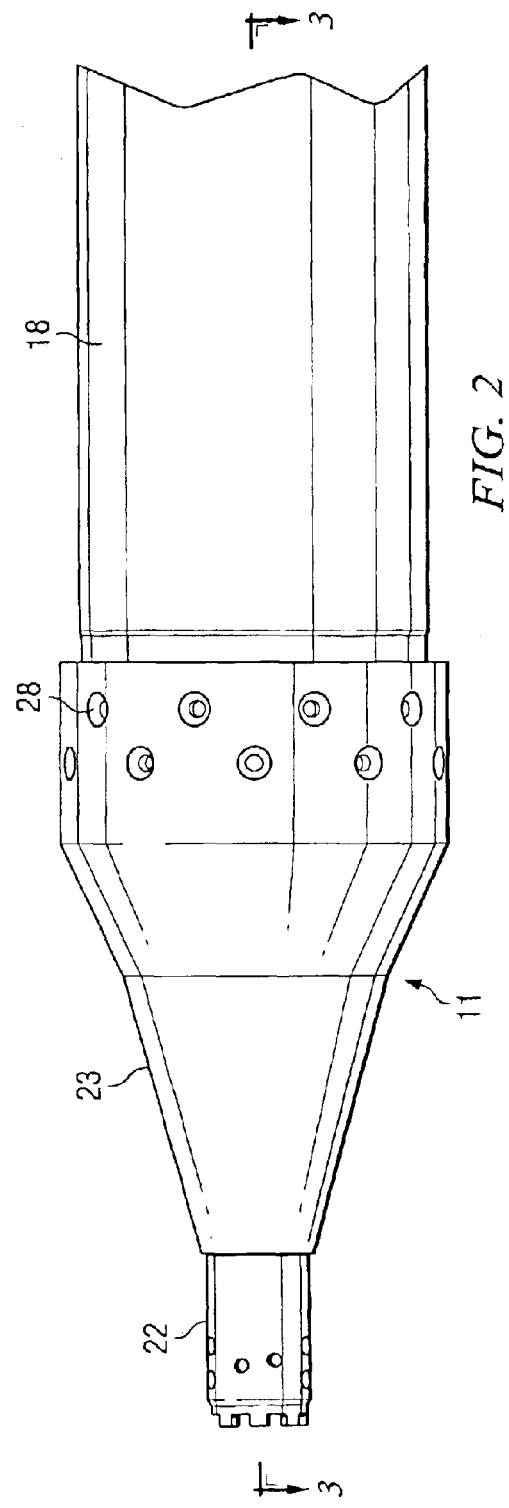

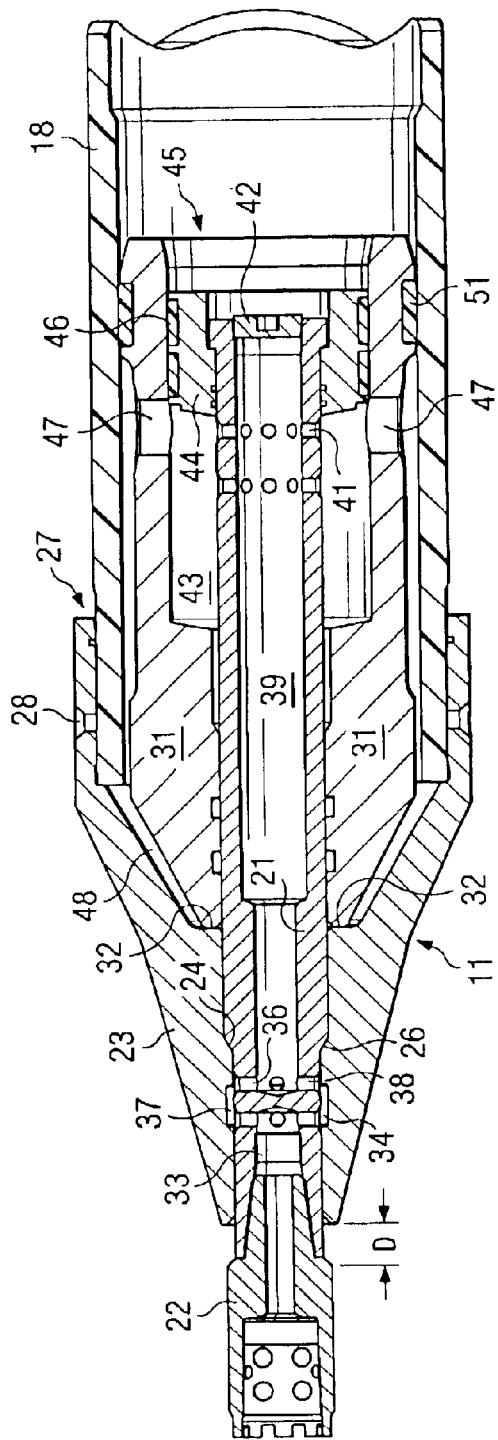
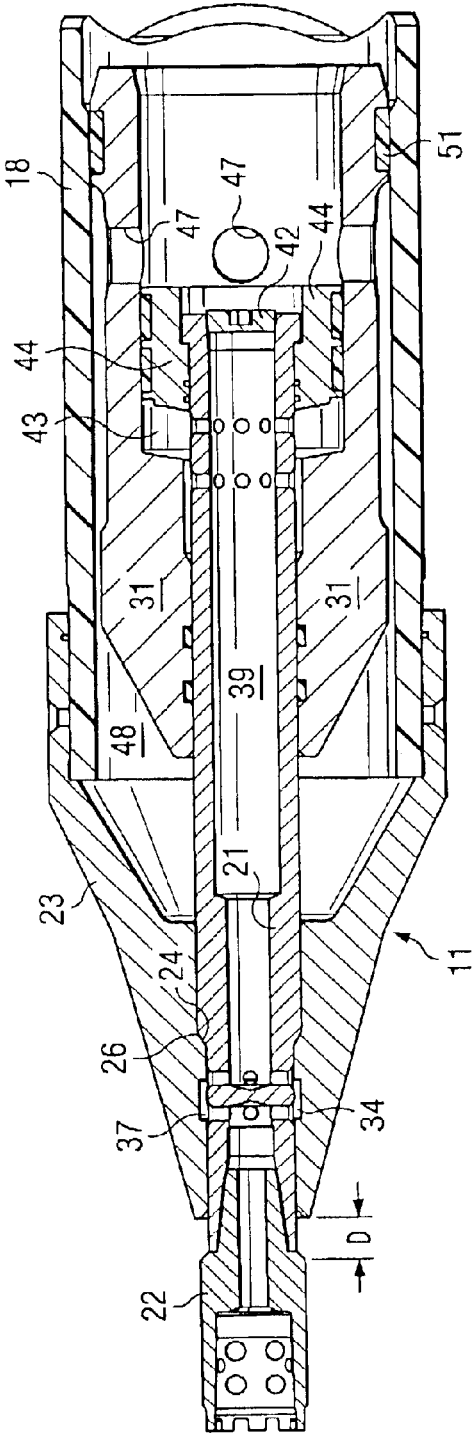
FIG. 3
FIG. 4

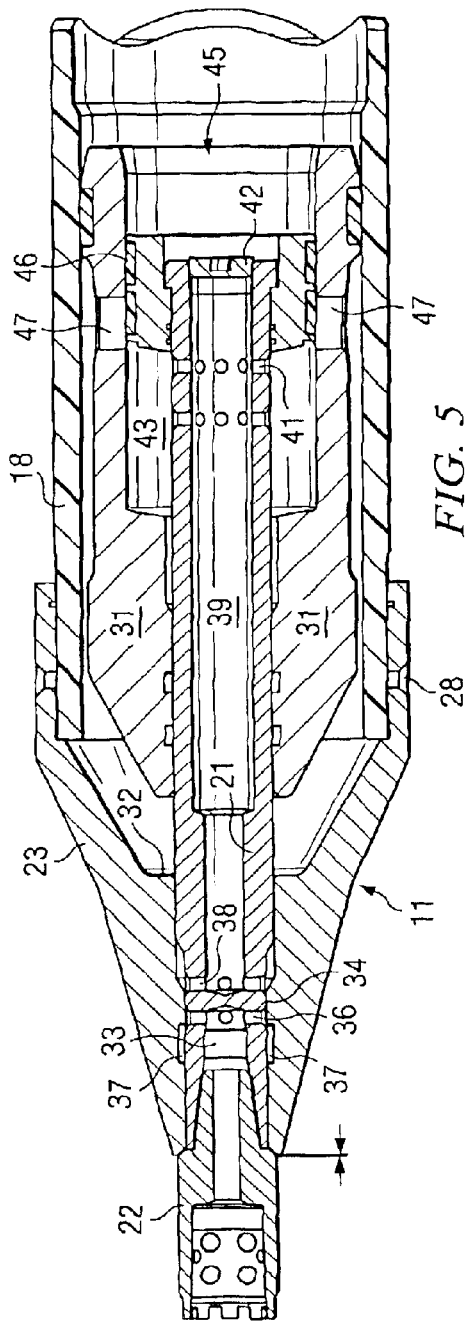
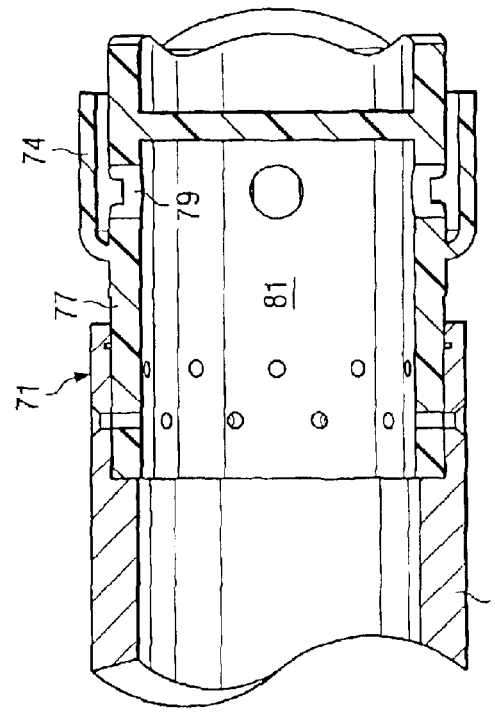
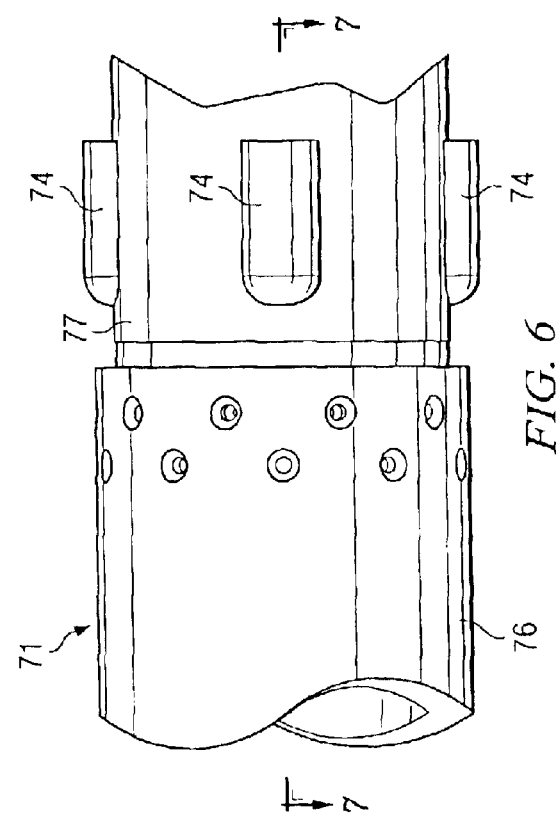

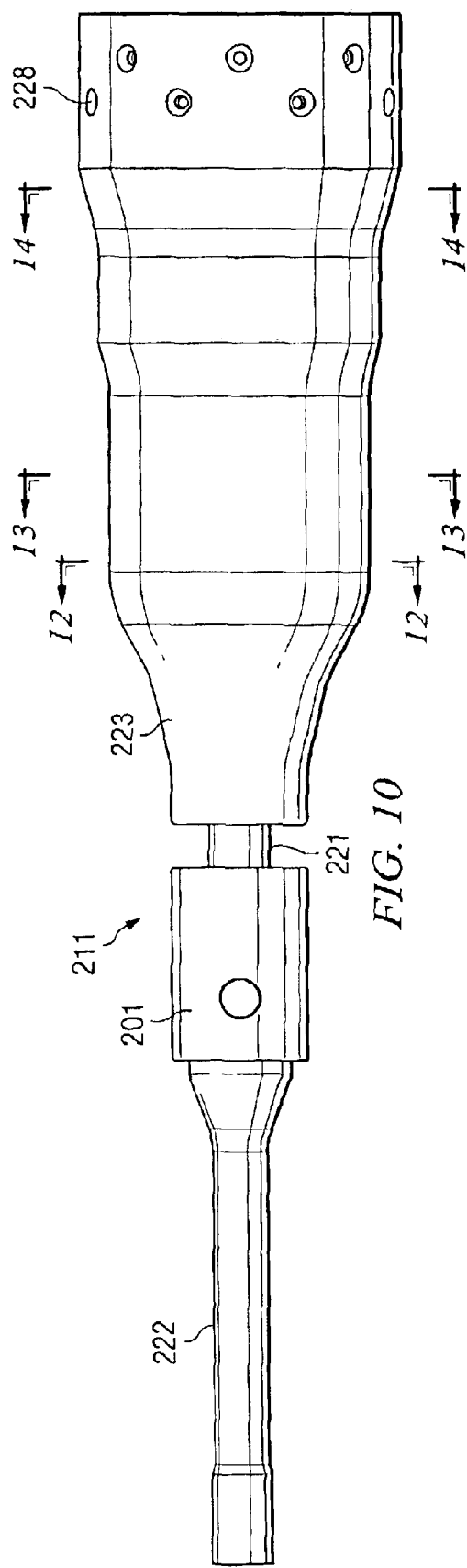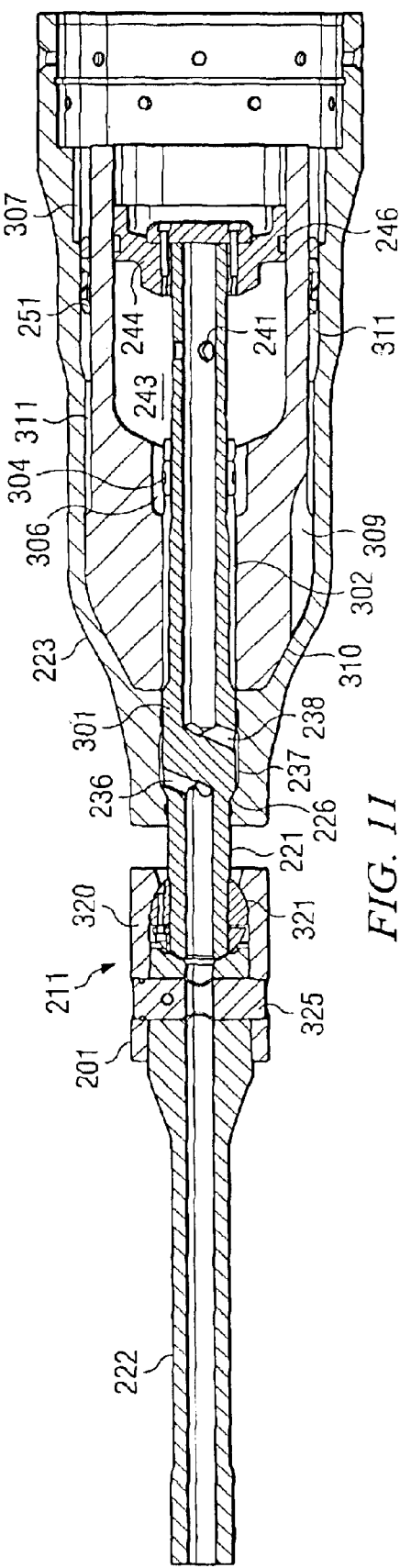

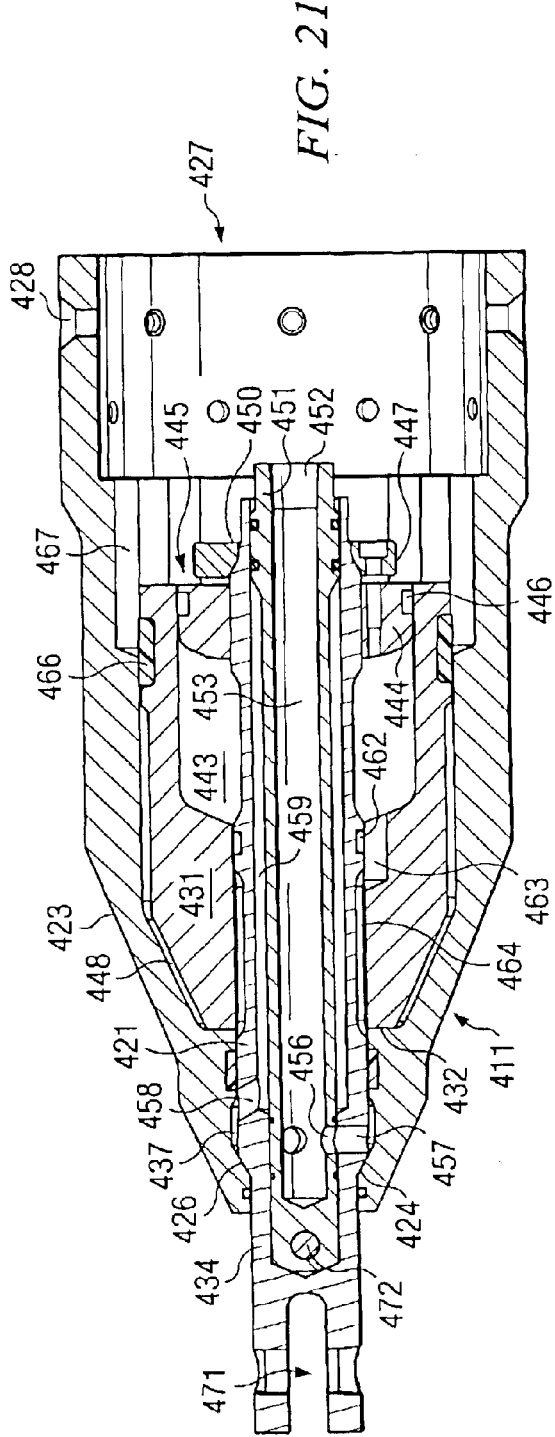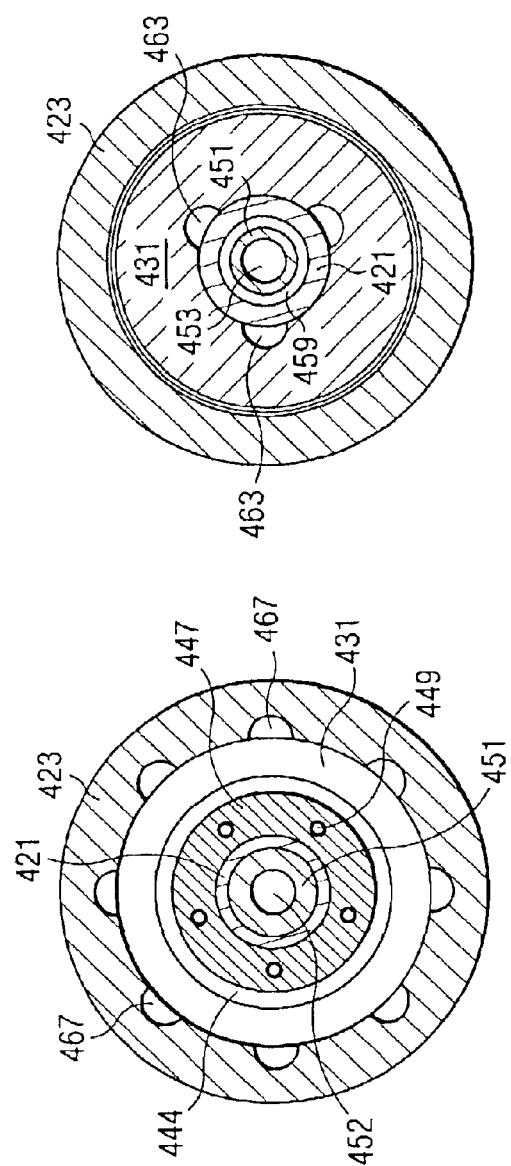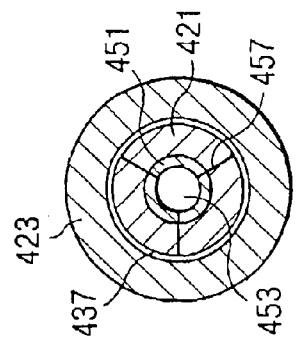

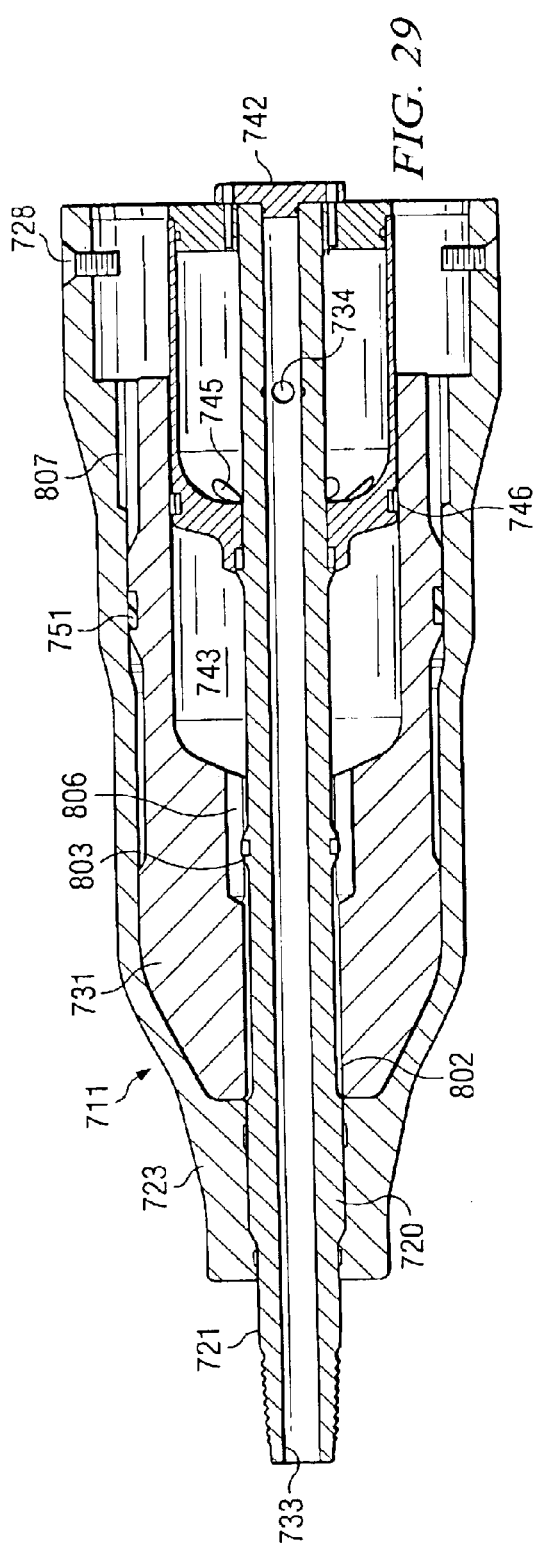
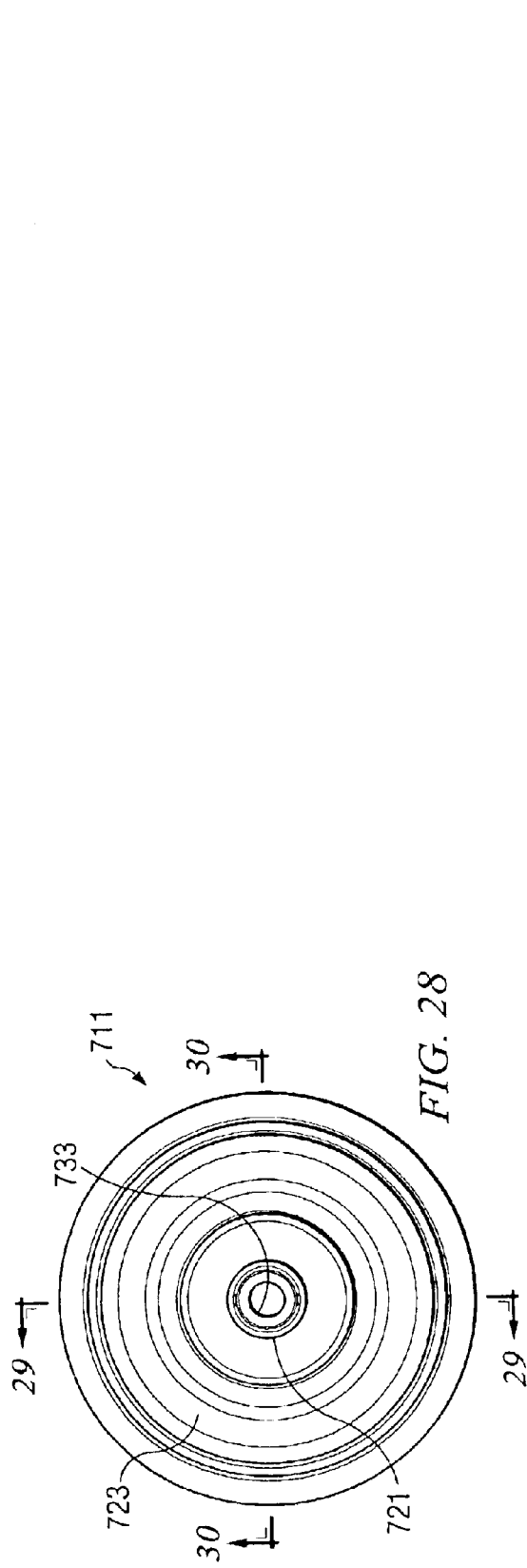

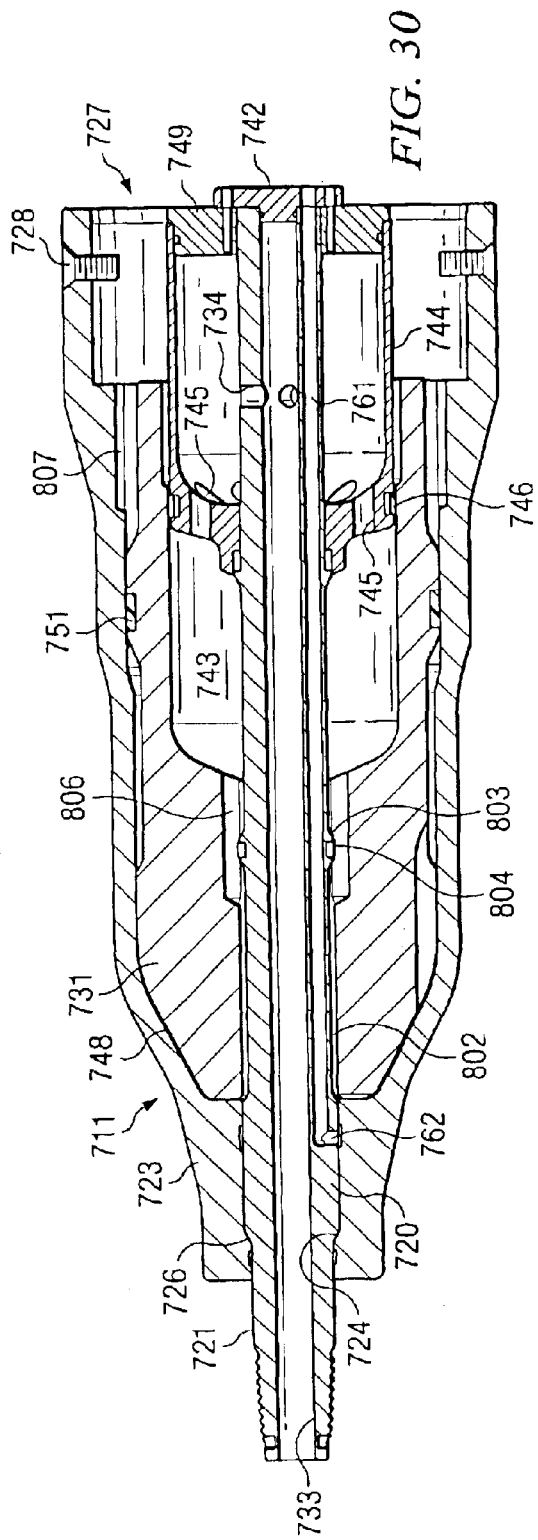
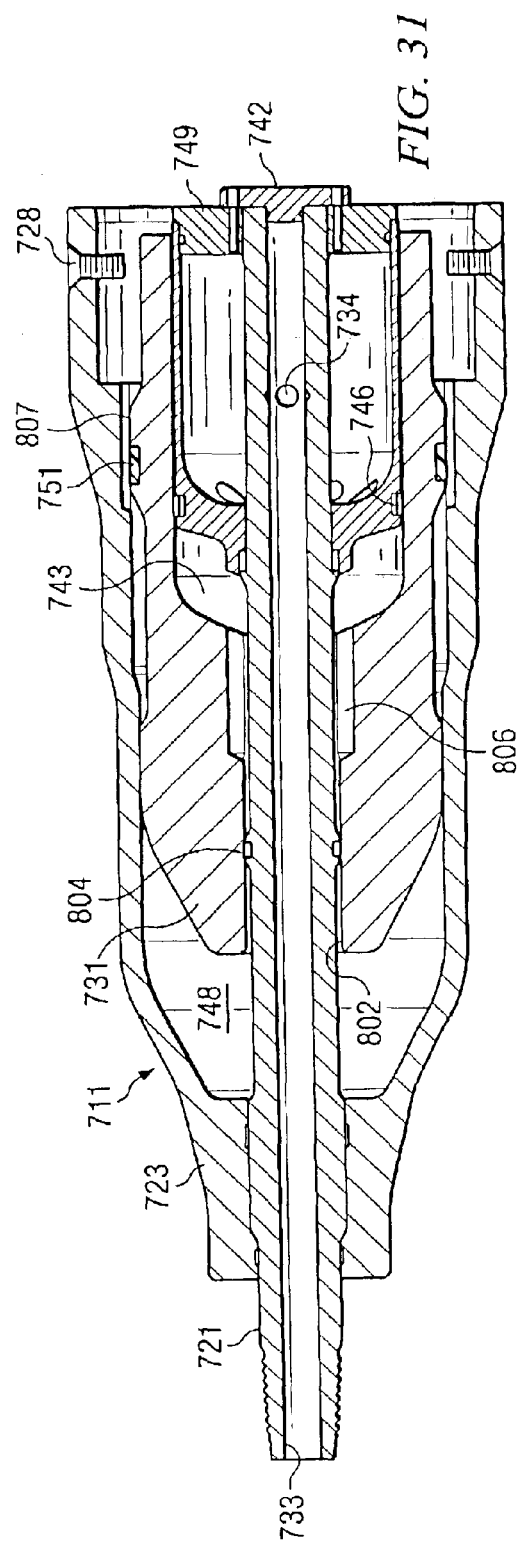

METHOD AND APPARATUS FOR REPLACEMENT OF UNDERGROUND PIPE

This application claims priority of U.S. Provisional Patent Application Ser. No.: 60/348,824, filed Jan. 14, 2002.

TECHNICAL FIELD

This invention relates to systems for underground pipe bursting and replacement.

BACKGROUND OF THE INVENTION

A variety of systems are now known for the installation of underground pipes, particularly for the replacement of an existing deteriorated pipe. Pneumatic impact tools that bore horizontal holes or burst existing pipelines are in widespread use. See, for example, Wentworth et al. U.S. Pat. No. 5,025,868. In one widely practiced method, a pneumatic impact boring tool is sent through the existing pipeline such that the head of the tool, which may be provided with blades that apply intense local pressure to the existing pipe, fractures or splits the existing pipe. See, for example, Streatfield et. al. U.S. Pat. Nos. 4,720,211, 4,738,565 and 4,505,302. A replacement pipe, typically made of plastic such as HDPE, is drawn along behind the boring tool. This process has proven effective commercially because it bursts the old pipe and replaces it with a new pipe at the same time. However, exhaust from the impact tool is vented into the interior of the replacement pipe, which is unacceptable for certain types of pipe installations, such as gas and water lines.

Directional drilling machines are less effective for pipe bursting, especially for hard to burst pipes like cast iron, because the steady pushing force of the drill string lacks the impact power of a pneumatic impact boring tool. Thus, in some instances, a directional borer or winch is used to pull a pneumatic impact tool through an existing pipeline in order to burst the existing pipe and pull in the replacement pipe. These alternatives are effective but require considerable equipment and manual labor.

Wentworth U.S. Pat. No. 5,782,311 describes a pipe bursting apparatus using a directional boring machine capable of simultaneously rotating and pulling a drill string and an impact tool connectable to the drill string. The impact tool includes a tubular housing ending in a front bursting head, an input shaft, bearings supporting the input shaft for rotation within the housing, a striker disposed for reciprocation within the housing to deliver impacts to a front anvil, and a drive mechanism for simultaneously pulling the impact tool forward in response to a pulling force on the input shaft and for reciprocating the striker to drive the tool forward by the action of cyclic impacts on the front anvil. The apparatus can carry out a pipe bursting operation in a manner that eliminates the need to use a separate pneumatic impact tool to burst the existing pipe. The present invention provides an impactor which operates using a pressure fluid such as compressed air, and which can be readily used with existing directional boring machines.

A number of cable operated static bursting systems have been used for pipe bursting. Carter et al. PCT Publication WO 98/30350 describes a pipe bursting system that makes use of a relatively small, light weight hydraulic cable puller to pull a pipe bursting mole. Fisk et al. U.S. Pat. Nos. 4,983,071 and 5,078,546 describe a cable-drawn tool backed by an impact tool and provided with a blade for slitting and expanding a steel gas main. Wentworth et al. U.S. Pat. No. 6,269,889 illustrates another bursting method wherein a pneumatic tool drawn by a conventional winch is used for pipe bursting. In general systems, that rely only on static pulling force either cannot handle large pipe sizes or require a very large, powerful pulling system that is expensive and labor intensive to use. System combining pulling force with an impact tool have been able to handle larger pipe sizes than comparable static force only systems, but difficulties have been encountered with starting and stopping the tool during a run. When the tool is far down the bore, it can be difficult to re-start the tool. The present invention addresses this disadvantage among others.

SUMMARY OF THE INVENTION

An impactor of the invention for use with a directional boring machine having a drill string includes a bursting head having a rearwardly opening recess and a front end opening that communicates with the recess, an inlet pipe connected at its front end to a distal end of the drill string and extending into the recess of the bursting head through the front end opening, a striker mounted for sliding movement along the inlet pipe, a distributing mechanism responsive to pressure fluid supplied through the drill string and inlet pipe to cause the striker to reciprocate in the rearwardly opening recess of the head to deliver forward impacts against the bursting head, a tubular housing in which the striker and distributing mechanism are mounted, a pulling connection by which the impactor can be pulled by the drill string while the striker is delivering impacts against the head in the same direction as a pulling force exerted by the drill string, and a valve which regulates supply of pressure fluid to the distributing mechanism. The bursting head is preferably slidably mounted on the inlet pipe and moves forward relative to the inlet pipe and drill string in response to an impact of the striker against the bursting head. The tubular housing, needed to provide sealed pressure chambers, may comprise a separate tool body, an extension of the bursting head, or a front end portion of the plastic replacement pipe, as explained hereafter.

In a preferred form of the invention, a valve is provided in the inlet pipe which can shut off flow of pressure fluid, such as in response to relaxation of pulling force on the drill string that changes the relative position of the inlet tube and the bursting head. The distributing mechanism expels exhaust air rearwardly out of the tubular housing, and typically suitable means is provided for pulling the replacement pipe along behind the bursting head. For example, the replacement pipe may be secured in the rearwardly opening recess of the head, such that a front end portion of the replacement pipe forms the tubular housing.

The distributing mechanism of the impactor may be of any suitable type, but one preferred mechanism includes a rearwardly opening recess in the striker, a radial outlet hole in the striker communicating with the recess, a rear seal bearing by which the striker slidingly, sealingly engages an inner surface of the tubular housing, a radial outlet hole in the inlet pipe permitting pressure fluid to enter the rearwardly opening recess in the striker from the inlet pipe, and a sleeve mounted on the inlet pipe rearwardly of the radial outlet hole therein in sliding, sealing contact with an inner surface of the striker inside the recess, forming a rear pressure chamber in the recess ahead of the sleeve. Pressure fluid in the rear pressure chamber causes a forward stroke of the striker resulting in an impact against the bursting head, and causes the radial outlet hole in the striker to move past a front edge of the sleeve. This in turn causes pressure fluid from the rear pressure chamber to pass outwardly to a front pressure chamber outside of the striker between the striker and the tubular housing, thereby causing the striker to move rearwardly until the radial outlet hole in the striker moves past a rear edge of the sleeve. The front pressure chamber then exhausts, and a new forward stroke of the striker begins. The sleeve of the distributing mechanism may be mounted on the inlet tube, so that no rear assembly for securing the distributing mechanism to the tubular housing is needed. "Radial" in the context of the invention means in a direction leading outwardly from a central axis, but is not limited to a direction that is perpendicular to a central axis. A radial outlet hole could, for example, also be slanted in a lengthwise direction.

An alternative pneumatic impact mechanism according to the invention can be used to advantage in a pipe bursting impactor and can be adapted to impact tools of other types, such as underground piercing tools and jack hammers. Such a mechanism includes as general components a tubular body having a rearwardly opening recess and a front end opening that communicates with the recess, an inlet pipe connectable at its front end to a source of pressure fluid and extending into the recess of the body through the front end opening, a striker mounted for sliding movement along the inlet pipe and an inside surface of the body for delivering forward impacts, the striker having a rearwardly opening recess and a front central opening of smaller diameter than the recess and which communicates with the recess, through which front opening the air inlet pipe extends, and a distributing mechanism responsive to pressure fluid supplied through the inlet pipe to cause the striker to reciprocate in a cycle. The distributing mechanism includes a radial hole in the inlet pipe permitting pressure fluid from inside the inlet pipe to enter the rearwardly opening recess in the striker, a sleeve mounted at a rear of the inlet pipe in slidable, sealing relationship with a wall of the rearwardly opening recess in the striker, forming a pressure chamber for driving the striker forwardly, a first passage for permitting pressure fluid from the rear pressure chamber to enter a front pressure chamber ahead of the striker to move the striker rearwardly after an impact, which passage is isolated from the rear pressure chamber during a part of the striker cycle in which the striker is propelled forwardly, and a second passage for exhausting the front pressure chamber after the striker has moved rearwardly a sufficient distance. Such a mechanism avoids the need for providing a radial hole through a thin tubular wall of the striker, which has been a frequent cause of breakage in "step bushing" style underground piercing tools going back to Sudnishnikov et al. U.S. Pat. Nos. 3,410,354 and 3,756,328.

According to another aspect of the invention, a pulling adapter is provided which can be attached to the rear end of the bursting head. The adapter has a sealing wall therein which prevents exhaust from the distributing mechanism from entering the replacement pipe, and exhaust holes permitting exhaust from the distributing mechanism to pass outside of the pulling adapter and replacement pipe. If the pulling adapter is made of plastic, it can be coaxially welded to a leading end of the replacement pipe.

The invention further provides an apparatus for use with a directional boring machine having a drill string for widening an existing hole. Such a system includes a head having a front nose portion and a rear, hole-widening portion of greater external diameter than the nose portion, and a ball joint in front of the nose portion configured for connecting the head to a drill string and permitting swiveling of the head relative to the drill string. The head may, for example, be an impactor that is pulled without rotation, or a back reamer that is rotated while being pulled to widen the existing hole. The ball joint may be provided with a passage therethrough for passing pressure fluid from the drill string to operate a pneumatic impactor. An adapter may be provided having a front end portion configured for connection to a leading end of the drill string and a mechanical coupling that connects a rear end portion of the adapter to a front end portion of the ball joint.

The invention in another aspect provides methods for replacement of an existing pipeline using a directional boring machine having a drill string and an impactor mounted at a terminal end of the drill string. In one such method, the impactor includes a bursting head, a striker which delivers impacts to the bursting head, and a pressure fluid-actuated impact mechanism. The method comprises:

(a) inserting the drill string through the pipeline;

(b) connecting a distal end of the drill string to the impactor;

(c) pulling the drill string and impactor into the pipeline while drawing a replacement pipe behind the impactor with a front end opening of the replacement pipe in a sealed condition;

(d) operating the impactor as needed to burst the pipeline by supplying a pressure fluid to operate the impactor, the pressure fluid including a lubricant; and (e) injecting exhaust pressure fluid including the lubricant from the impactor outside the impactor and replacement pipe. A baffle or spout may be used to direct the pressure fluid rearwardly towards the replacement pipe. This both avoids contaminating the inside of the pipe with the exhaust and aids in installing the new pipe.

In another method for replacement of an existing pipeline of the invention, the pressure fluid-actuated impact mechanism has a valve regulating supply of pressure fluid to the impactor. The method includes the steps of:

(a) inserting the drill string through the pipeline;

(b) connecting a distal end of the drill string to the impactor;

(c) pulling the drill string and impactor into the pipeline while drawing a replacement pipe behind the impactor;

(d) actuating the impactor by pulling on the drill string, which causes the valve to supply pressure fluid to the impact mechanism; and (e) stopping the impactor by reducing pulling force on the drill string. This eliminates the need to manually stop and start the impactor during bursting operation.

The invention further provides a method and apparatus for replacement of an underground pipe wherein a cable or other flexible pulling implement (such as a chain) can be used to pull the impactor. An impactor according this aspect of the invention includes a bursting head having a rearwardly opening recess, a striker mounted for sliding movement within the head, a distributing mechanism responsive to pressure fluid supplied through an inlet to cause the striker to reciprocate in the rearwardly opening recess of the head to deliver forward impacts against the head, and a pulling connection by which the impactor can be pulled while the striker is delivering impacts against the head in the same direction as a pulling force. A length of a flexible pulling implement such as a cable is engagable to the connection at the front end of the impactor for delivering the pulling force. A cable pulling system pulls the cable in a plurality of repeated cyclic pulling strokes. Such a system includes one or more holders such as collets that engage the cable and one or more cylinders each having a movable piston operative to move the holders along the pulling stroke. In a preferred embodiment, an inlet pipe extends into the recess of the head for supplying compressed air to the distributing mechanism, and a valve in the inlet pipe shuts off flow of pressure fluid to the distributing mechanism when closed. The pulling connection may be disposed at a front end of the inlet pipe, whereby the valve is opened by pulling on the pulling connection with a pulling device and closed by relaxation of pulling force exerted by the pulling device.

A method for replacement of an underground pipe using such an apparatus includes the steps of:

(a) inserting a cable through an existing pipeline from a first end to a second end thereof;

(b) connecting a free end of the cable extending from the second end of the pipeline to an impactor, which impactor includes a bursting head having a rearwardly opening recess, a striker mounted for sliding movement within the head, a distributing mechanism responsive to pressure fluid supplied through an inlet to cause the striker to reciprocate in the rearwardly opening recess of the head to deliver forward impacts against the head, and a pulling connection to which the cable is connected;

(c) pulling the impactor with the cable using a cable pulling system disposed at the first end of the pipeline, which cable pulling system pulls the cable in a plurality of repeated cyclic pulling strokes and includes a holder that engages the cable and a cylinder having a movable piston operative to move the holder along the pulling stroke;

(d) operating the impactor to deliver impacts against the head in the same direction as the pulling force during a cyclic pulling stroke; and (e) reducing operation of the impactor between cyclic pulling strokes so that the impactor does not substantially move between strokes. "Reducing" in this context means lessening the impact force delivered by the striker to the bursting head, generally by reducing the supply of compressed air or pressure fluid to the impactor partially or completely, as explained further hereafter. These and other aspects of the invention are discussed in the detailed description that follows.

BRIEF DESCRIPTION OF THE DRAWINGS

In the accompanying drawings, like numerals represent like elements except where section lines are indicated:

FIG. 1 is a schematic diagram of an installation according to a method of the invention;

FIG. 2 is an enlarged view of the impactor shown in FIG. 1;

FIG. 3 is a lengthwise section taken along the line 3—3, showing the striker in contact with the anvil surface of the bursting head;

FIG. 4 is the same view as FIG. 3, with the striker retracted to it exhaust position;

FIG. 5 is the same view as FIG. 3, with the bursting head in position to shut off the air valve;

FIG. 6 is a partial, rear end view of an alternative embodiment of the impactor of the invention;

FIG. 7 is a lengthwise section along the line 7—7 in FIG. 6;

FIG. 10 is a side view of the second embodiment of an impactor according to FIGS. 8 and 9, in an operative position;

FIG. 11 is a lengthwise sectional view of the impactor of FIG. 10;

FIG. 21 is a lengthwise sectional view taken along the line 21—21 in FIG. 20;

FIG. 22 is a cross sectional view taken along the line 22—22 in FIG. 20;

FIG. 23 is a cross sectional view taken along the line 23—23 in FIG. 20;

FIG. 24 is a cross sectional view taken along the line 24—24 in FIG. 20;

FIG. 28 is a front view of a further embodiment of an impactor according to the invention;

FIG. 29 is a lengthwise section taken along the line 29—29 in FIG. 28;

FIG. 30 is a lengthwise section taken along the line 30—30 in FIG. 28;

FIG. 31 is the same view as FIG. 29, taken with the striker in a retracted position;

Figure 8:
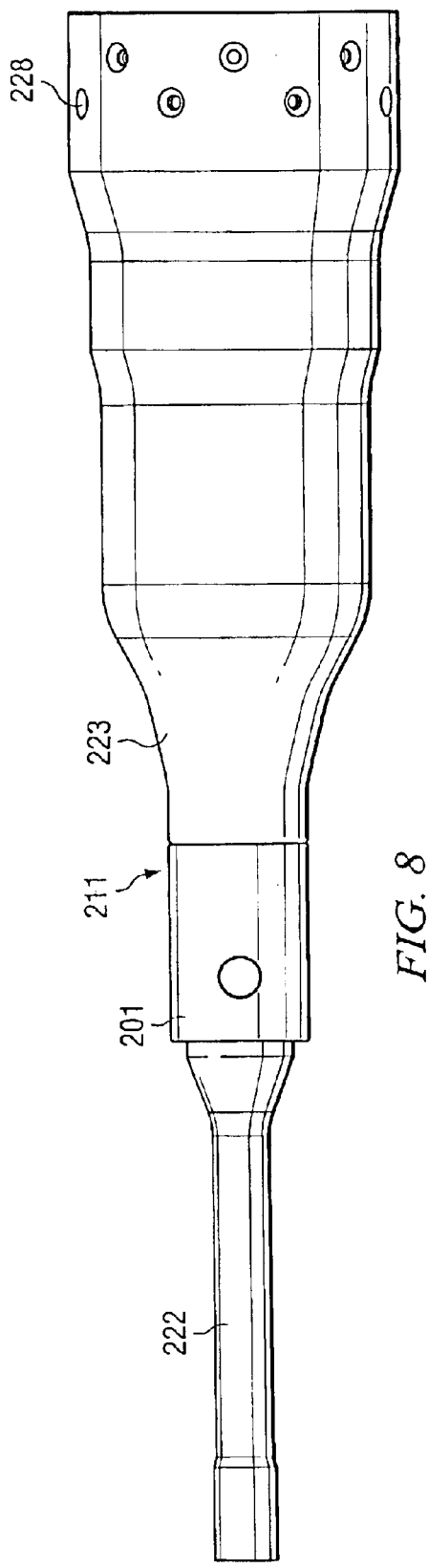
FIG. 8 is a side view of a second embodiment of an impactor according to the invention in an inoperative position.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and are not to limit the scope of the invention.

DETAILED DESCRIPTION

Referring to FIG. 1, a pipe bursting and replacement system 10 according to the invention includes an impactor 11 pulled by a directional drilling machine 12 by means of a drill string 13. Impactor 11 is positioned at a starting location, such as a manhole or entrance pit 14, and pulled through an existing pipeline 16, bursting it into fragments 17 which remain in the ground. The replacement pipe 18 is drawn along behind impactor 11 and occupies the same space as the existing pipeline.

Impactor 11 as shown in FIGS. 2–5 includes an impact mechanism that aids in boring through the ground or bursting an existing pipe. Impactor 11 includes a central air inlet tube 21 that may be connected either directly or by means of an adapter 22 to the terminal end of drill string 13. A conical shell or bursting head 23 is mounted on the outside of tube 21 in close sliding contact therewith. A shoulder 24 leading to an enlarged outer diameter rear portion of tube 21 engages a slanted step 26 on the inner surface of head 23 so that pulling the drill string 13 pulls head 23 forward into contact with the existing pipeline or borehole. The replacement pipe 18 fits into a rear end opening 27 in head 23 and is secured therein by fasteners such as screws inserted through radial holes 28 through a rear cylindrical portion of head 23. Pipe 18 is typically made of plastic, and as such screws used for this purpose tap directly into pipe 18. For purposes of the invention, pipe 18 may comprise the front end portion of the actual pipe 18 or a separate plastic tool body (which may be slightly thicker than pipe 18 as illustrated) to which an end of pipe 18 is welded, as described in commonly assigned Wentworth U.S. Pat. No. 6,269,889, issued Aug. 7, 2001, the entire contents of which are incorporated by reference herein.

A striker 31 is mounted at its front end on the outer surface of tube 21 rearwardly of head 23. During operation, a pressure fluid such as compressed air fed through tube 21 can be used to reciprocate striker 31, causing it to deliver rapid impacts to a rearwardly facing inner anvil surface 32 of head 23. For this purpose, compressed air is fed from machine 12 through drill string 13 and into tube 21. Tube 21 has a front central flow passage 33 that leads to an internal valve 34. Valve 34 controls operation of the impact mechanism. Front flow passage 33 ends as shown in one or more radial passages 36 which form part of valve 34. In the position shown in FIG. 3, passages 36 communicate with an annular groove 37 on the inner surface of head 23. Compressed air can flow from passages 36 through groove 37 to a second set of radial passages 38 rearwardly of passages 36. Passages 38 pass compressed air in turn to a rear flow passage 39 in tube 21 through to a series of rear radial passages 41 located towards the rear end of tube 21, which end is sealed as by a cap 42.

By this means, the compressed air is directed into a rear pressure chamber 43 formed by a rearwardly opening recess 45 in striker 31 and a sleeve 44 secured on tube 21 rearwardly of holes 41. Seals 46 mounted in annular grooves on the outside of sleeve 44 are in sliding, sealed engagement with the inner surface of striker 31. As a result, compressed air in chamber 43 can only escape through radial ports 47 into an annular front (variable) pressure chamber 48. An annular seal 51 on a rear outer surface of striker 31 prevents compressed air from escaping from front chamber 48. As a consequence, the greater frontal surface area of striker 31 causes the net force exerted by the compressed air to move the striker 31 rearwardly until ports 47 pass over the rear edge of sleeve 44 as shown in FIG. 4. At this point, the front pressure chamber 48 exhausts into the interior of the replacement pipe 18, the pressure in constant pressure chamber 43 becomes greater than the pressure in front chamber 48, and striker 31 is propelled forwardly until it impacts against anvil surface 32. The cycle then repeats as long as the valve 34 remains open. In this embodiment, the impact mechanism is sized to fit closely inside of pipe 18 and use pipe 18 as the impact tool body, eliminating the need for an expensive steel tool body. Unlike strikers commonly used in pneumatic ground piercing tools, striker 31 slides along the outside of tube 21 but preferably does not engage the inside of pipe 18 or a corresponding metal tool body anywhere other than at rear seal 51.

Bursting head 23, unlike the body of a typical pneumatic piercing tool, is preferably free to move forward relative to the rest of impactor 11 in response to the impact it receives from striker 31 over a short distance D. An enlarged diameter front portion of the adapter 22 defines a stop for the front end 56 of head 23, but in practice distance D is selected so that head 23 does not move forward more than a very limited distance, preferably slightly less than distance D, typically about 0.1 to 0.5 inch during normal operation. The resistance of the ground and/or existing pipeline ahead of head 23, together with the inertia of the replacement pipe 18, limits such forward movement. Decoupling head 23 from the drill string 13 is preferred in the invention because a fixed expander would permit impacts from the striker to be directly transmitted to the drill string, damaging both drill string 13 and directional boring machine 12. To the extent this movement closes air valve 34 fully or partially, the constant pulling force exerted by the drill string after the impact will reopen valve 34.

In the alternative, if the expander is not moveable relative to the inlet tube, then it is preferred to interpose a soft link or cable between the terminal end of the drill string and the front of impactor 11, so that the impact force is not transmitted back through the drill string during an impact, but the impactor 11 can still be pulled by the drill string. For this purpose, it may be necessary to provide both a cable connection (for pulling) and a separate air hose for conducting compressed air from the drill string to the head, with resulting inconvenience to the operator.

For some boring operations, such as installation of a gas or water line, it may be desirable to avoid contaminating the inside of the replacement pipe with the impactor exhaust, which carries with it oil and other contaminants. For this purpose, as shown in FIGS. 6 and 7, a separate tool body 71 which may be all plastic, or may comprise a front metal portion 76 coupled to a rear plastic portion 77 by screws, threads, or the like. Plastic rear portion 76 has a sealing end wall 78 and one or more radial holes 79 just ahead of wall 72. In the alternative, the leading end of the replacement pipe can be towed along behind the impactor in a conventional manner, with a removable cap secured over its open end to prevent contamination. By such means, during the exhaust part of the cycle, compressed air leaving the front pressure chamber can escape to the outside of pipe 18. An overhanging flange 74 or one-way valve mechanism can be used to prevent debris from entering through holes 79 during periods when space 81 ahead of end wall 78 is not pressurized. If tool body 71 or rear portion 77 is plastic of the same type as pipe 18, the two may be welded together end to end and later sawed apart when the run is finished as described in Wentworth U.S. Pat. No. 6,269,889.

According to a preferred version of this embodiment, the pressure fluid used to power the impact mechanism includes a foaming agent of a type known in the art which causes compressed air to turn into a lubricant foam upon depressurization. The exhaust will then become a foam on the outside of the pipe 18 that lubricates it and eases its passage into the ground, improving boring efficiency due to less friction between the replacement pipe and the ground, and reducing damage to the new pipe as it is dragged through the ground with fragments of the old pipe around it.

When the unit is running, valve 34 is open as discussed above and shown in FIGS. 3 and 4. However, when the drill string stops exerting a pulling force on impactor 11, head 23 moves to its frontwardmost position as shown in FIG. 5. Annular groove 37 becomes isolated from rear radial passages 38, cutting off the supply of compressed air to the impact mechanism and causing the striker to stop. The impact mechanism then restarts when pulling force exerted by the drill string once again causes the valve to open as shown in FIGS. 3 and 4. In this manner, the movement of head 23 over a limited range serves a dual purpose in acting both as a shutoff valve and protecting the drill string from impacts.

In operation, such as shown in FIG. 1, drill string 13 is first sent through the existing pipeline to the starting location. This is preferably accomplished by operating the directional drilling machine 12 with a conventional drill bit to bore from a first surface location 15 on the ground surface to the exit location, such as an exit pit or manhole 19. The drill string is then extended through the existing pipeline 16 to the entry location, such as an entry pit or manhole 14. Here the bit is reattached, and the boring machine drills upwardly to a second surface location 20. If necessary, a deflection plate positioned at the bottom of manhole 14 can be used to direct the drill string 13 upwardly at the desired angle, or chains pulled by a winch can be used to pull the drill string upwardly in manhole 14. When the bit and drill string reach the second surface location 20, the bit is removed and replaced by impactor 11, and replacement pipe 18 is attached to the back of impactor 11 by screws or welding as discussed above, or by other suitable means such as a pipe pulling adapter.

The drill string is then pulled back down to the entry pit or manhole 14 to begin the run. Machine 12 is then operated to pull impactor 11 back to the exit location 19 as shown while supplying compressed air or other fluid through the inside of the drill string to operate the impact mechanism. Each time a new section of drill rod must be added, valve 34 causes the impact mechanism to stop automatically in response to the reduced tension on the drill string as described above, without need for the operator to control the operation of the impactor manually. This is a key advantage of the present invention in that virtually all pipe bursting systems presently in commercial use operate intermittently, not continuously. The impactor must stop while the operator adds or removes another rod to the drill string, or between strokes in the case of hydraulic pulling systems. When impactor 11 emerges into the exit pit or manhole 19, it can be disconnected from replacement pipe 18, and the entire mechanism pulled out of the pipe and removed through the mouth of manhole 19.

The impact mechanism of the invention can deliver powerful impacts with a much simpler impact mechanism than systems that rely on rotation of the drill string, spring force or the like to propel the striker. The use of foam injected outside of the hole of the replacement pipe will lubricate the replacement pipe, making it easier to pull. The foregoing structure decoupling the head so that it can move relative to the drill string greatly reduces wear on the drill string and boring machine, but without need for additional connectors such as a soft link.

FIGS. 8 to 17 illustrate an alternative impactor 211 according to the invention. Impactor 211 includes a central air inlet tube 221 that may be connected either directly or by means of an adapter 222 to the terminal end of drill string 13. However, in this embodiment, adapter 222 is connected to tube 221 by a ball joint 201 described hereafter. A stepped conical shell or bursting head 223 is mounted on the outside of tube 221 in close sliding contact therewith. A shoulder 224 of tube 221 engages a slanted step 226 on the inner surface of head 223 so that pulling the drill string 13 pulls head 223 forward into contact with the existing pipeline or borehole. The replacement pipe 18 fits into a rear end opening 227 in head 223 and is secured therein by fasteners such as screws inserted through radial holes 228 through a rear cylindrical portion of head 223. In this embodiment, head 223 has sufficient length to house the entire impact mechanism; the replacement pipe is not used as the tool body.

A striker 231 is mounted at its front end on the outer surface of tube 221 rearwardly of head 223. During operation, as in the preceding embodiment, a pressure fluid such as compressed air fed through tube 221 reciprocates striker 231, causing it to deliver rapid impacts to a rearwardly facing inner anvil surface 232 of head 223. For this purpose, compressed air is fed from machine 12 through drill string 13, adapter 222, and ball joint 201 into tube 221. Tube 221 has a front central flow passage 233 that leads to an internal valve 234 that controls operation of the impact mechanism. Front flow passage 233 ends in one or more rearwardly angled, radial passages 236 which form part of valve 234. Passages 236 communicate with an annular groove 237 on the inner surface of head 223. Compressed air can flow from passages 236 through groove 237 to a second set of radial passages 238 rearwardly of passages 236 when in the open position shown in FIG. 11. Passages 238 pass compressed air to a rear flow passage 239 in tube 221 through to a series of rear radial passages 241 located towards the rear end of tube 221, which end is sealed as by a cap 242. By this means, the compressed air is directed into a rear pressure chamber 243 formed by a rearwardly opening recess 245 in striker 231 and a sleeve 244 secured on tube 221 rearwardly of holes 241. Seals 246 mounted in annular grooves on the outside of sleeve 244 are in sliding, sealed engagement with the inner surface of striker 31. The rear end of tube 221 is sealed by a cover plate 247 that is secured by bolts 249 to the back of sleeve 244.

Figure 9:
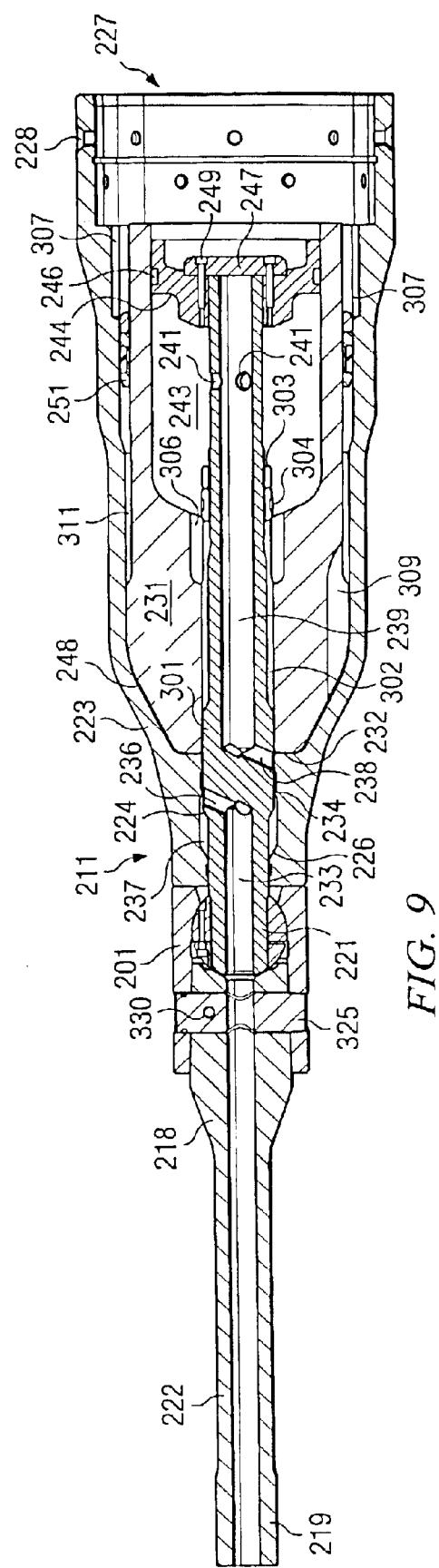
FIG. 9 is a lengthwise sectional view of the impactor of FIG. 8.

At this point, the impact mechanism differs substantially from the prior embodiment. No radial ports through the striker similar to ports 47 are provided. Instead, air inlet tube 211 has a front, enlarged diameter portion 301 that sealingly engages the inside of head 223. Passages 236,238 open at the front and rear ends of front portion 301, respectively. When impactor 11 is in its off position as shown in FIG. 9, an annular passage 302 extending frontwardly between the outside of tube 221 and the inside of striker 231 is sealed off from a front variable volume pressure chamber 248, effectively providing a second valve for stopping the impactor when required. When tube 221 is pulled forward by the drill string to the position shown in FIG. 11, passage 302 is now capable of supplying compressed air from the rear chamber 243 to the front of the striker, i.e. to front chamber 248. A rear, enlarged diameter portion 303 of tube 221, preferably provided with a sealing ring 304, also sealingly engages the inside of head 223 to seal off passage 302 at certain times in the cycle. A rearwardly-opening counterbore or a number of parallel grooves 306 in the wall of passage 302 which act as bypass passages permitting compressed air to flow past enlarged portion 303 when the striker has delivered its impact as shown in FIG. 9, causing the striker to move rearwardly. Front chamber 248 becomes isolated from rear chamber 243 when portion 303 reaches the front end of counterbore 306.

Figure 15:
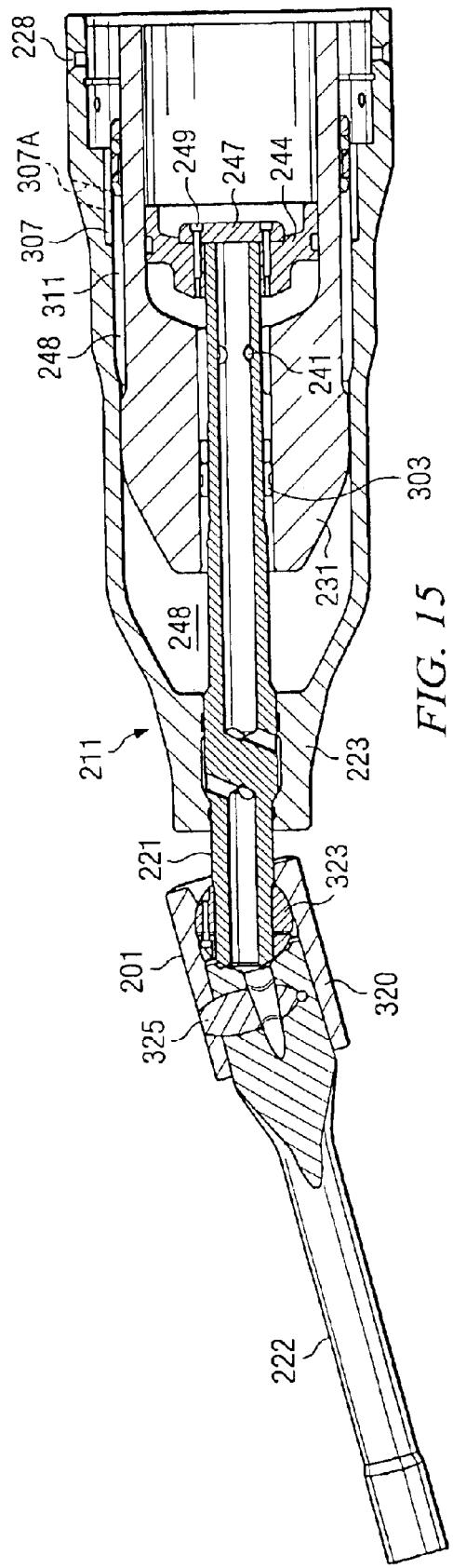
FIG. 15 is a side view, partly in lengthwise section, of the impactor of FIGS. 8 through 14 in a bent position.
Figure 16:
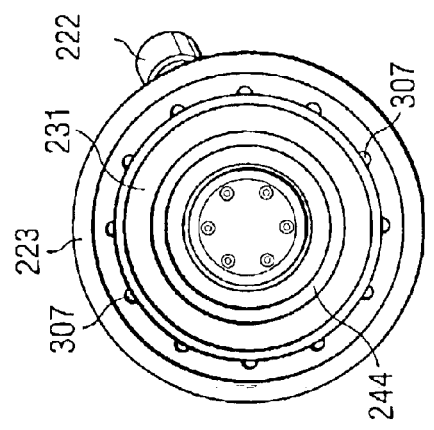
FIG. 16 is a rear view of the impactor of FIG. 15.
Figure 14:
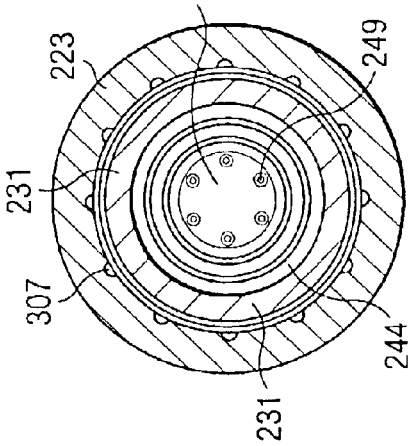
FIG. 14 is a cross sectional view taken along the line 14—14 in FIG. 10.
Figure 13:
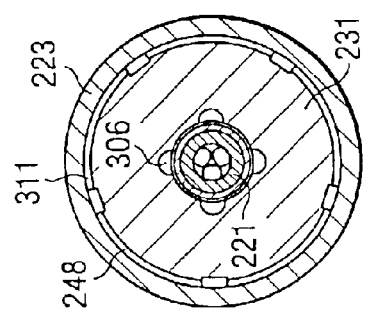
FIG. 13 is a cross sectional view taken along the line 13—13 in FIG. 10.
Figure 12:
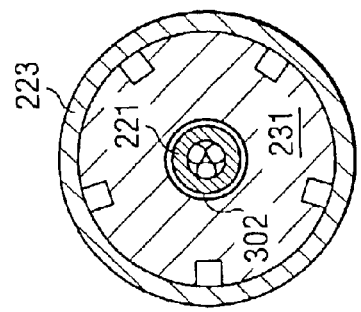
FIG. 12 is a cross sectional view taken along the line 12—12 in FIG. 10.

The front pressure chamber exhausts when a rear annular seal 251 on the outside of the striker clears one or more lengthwise exhaust passages 307 machined on the inside of head 223 as shown in FIG. 15. The pressure in rear pressure chamber 243 then becomes greater than the pressure in front chamber 248, and the impact cycle repeats. For purposes of permitting the space ahead of the striker 231 to communicate with exhaust passages 307, striker 231 has one or more lengthwise grooves 309 through the head portion of the striker that engages the inside of head 223 rearwardly of the tapered nose 310 thereof and a reduced diameter rear portion forming an annular air passage 311 which extends back to exhaust passage 307. Seal 251 and rear portion 303 of tube 221 are shown as threaded-on rings, but unless adjustability is needed, are preferably integral with their respective base parts.

The striker continues to reciprocate in this manner until tension is relaxed on the drill string, which causes the gap between the head 223 and ball joint 201 to close, closing valve 234 and cutting off the supply of compressed air (or other fluid) to rear chamber 243. Exhaust passages 307 may if desired by directed radially or at an angle rearwardly to direct the exhaust outside of the bursting head, instead of into the replacement pipe, for the reasons discussed above. Passages 307A (dotted), replacing passages 307, may be located for this purpose.

Figure 17:
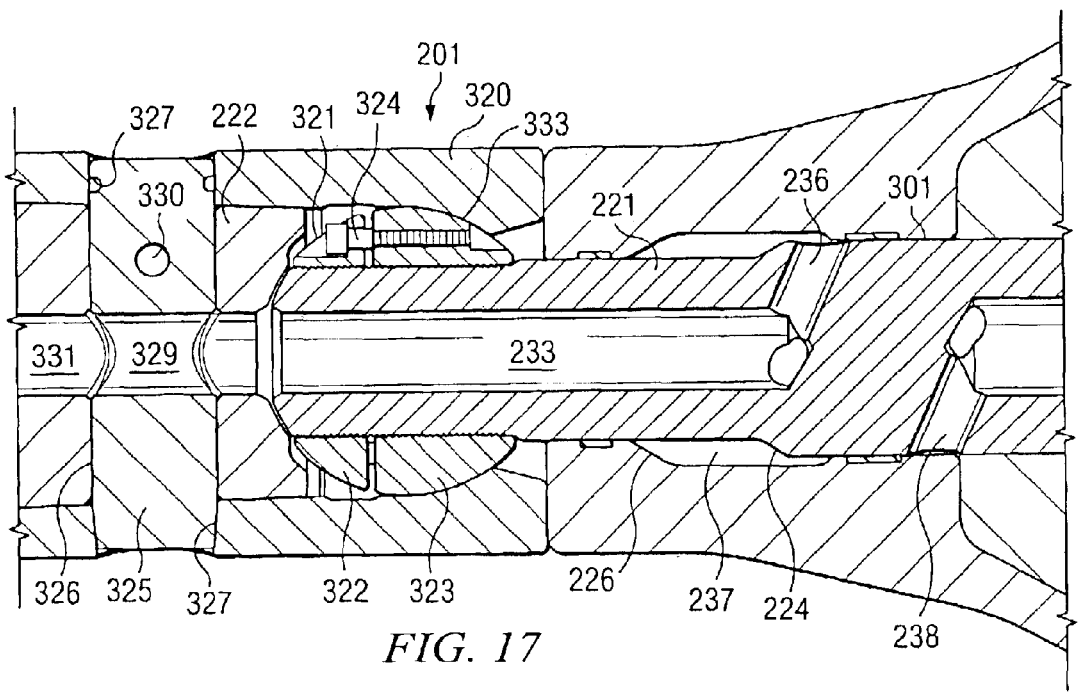
FIG. 17 is an enlarged view of the ball joint and valve mechanism shown in FIG. 9.

Ball joint 201 toward the front of impactor 211 provides flexibility for occasional bending of the device relative to the drill string and aids in removal of impactor 211 from a man-made confined space such as a manhole, where enlarging the space to remove the head would entail damage an existing structure. Ball joint 201 includes a cylindrical, frontwardly opening socket 320 of the same diameter as a front end of head 223, a ball assembly 321 disposed at the bottom of socket 320, and a pin 325 for coupling the ball joint 201 to a widened rear end portion 218 of adapter 222. A front end portion 219 of adapter 222 has internal or external threads as appropriate for direction connection to a leading end of the drill string. As shown in FIG. 17, ball assembly 321 comprises front and rear sections 322, 323 coupled by bolts 324. Sections 322, 323 have aligned, threaded holes therethrough which permit ball joint 201 to be threadedly secured to external threads on a front end portion of tube 221. Tightening bolts 324 with a slight separation between sections 322, 323 applies a clamp load to each of the threaded connections and makes ball joint 201 more secure, yet more easily removed upon loosening of bolts 324.

After ball assembly 321 and socket 320 have been mounted on tube 221 as shown, a rear end of adapter 222 is inserted into socket 320 until a transverse hole 326 therein is in alignment with a pair of like-sized transverse holes 327 in socket 320. Pin 325 is then inserted into holes 326, 327 to couple adapter 222 and ball joint 201 together. Pin 325 may be press-fit therein or secured by a further retaining pin, such as a rolled pin, oriented perpendicularly to the length of pin 325 and extending through a hole 330 in pin 325 and corresponding holes in socket 320 and adapter 222 in alignment with hole 330. Pin 325 has a hole 329 therethrough which aligns with a bore 331 of adapter 222 and passage 233 for passing compressed air or other pressure fluid to the impact mechanism. A front end surface 332 of adapter 222 is rounded like an inner retaining surface 333 of socket 320 to match the curvature of ball assembly 321. A slight clearance remains between adapter 222 and ball assembly 321 through which compressed air can enter the ball joint, but the steel-to-steel contact of ball assembly 321 with surface 333 of socket 320 provides a sufficient seal when the impactor is running.

Figure 18:
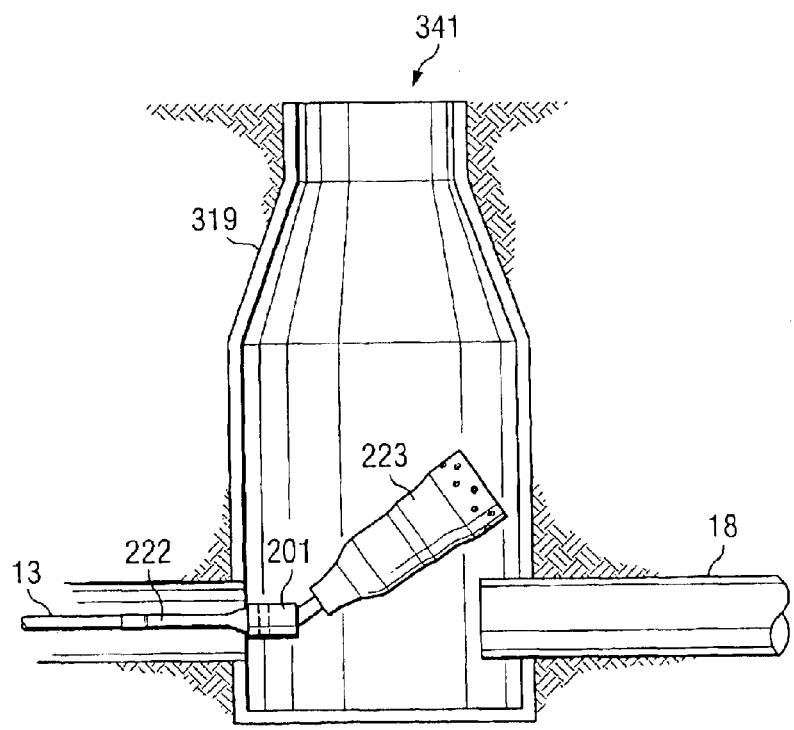
FIG. 18 is a schematic diagram of a method of removing an impactor according to the invention from a manhole.

Ball joint 201 provides a number of advantages. When the bursting head enters the existing pipe, the drill string will be bent at an angle. The ball joint makes it easier to align the bursting head with the existing pipe, and makes it easier for the head to follow slight changes of direction in the existing pipe without becoming jammed. Referring to FIG. 18, once the device enters an exit manhole 319, the impactor 211 must be removed and withdrawn through the existing manhole opening 341. For this purpose, impactor 211 must be removed from both the drill string 13 (at the front) and the replacement pipe 18 (at the back.) Any box-pin style joint requires moving the affected parts axially apart from one another. The manhole 319 may be too narrow to permit this when impactor 211 is straight (coaxial) relative to the drill string. According to a method of disassembly according to the invention, the drill string is first pulled forward far enough so that the screws set in openings 228 are accessible, and impactor 211 is disconnected from replacement pipe 18 by removing the screw, bolts, or other fasteners. At this point, ball joint 201 may actually be a few inches outside of the manhole on the opposite side. Head 223 is then tipped up and over the end of pipe 18, and the drill string 13 is then moved back a short distance (e.g., six to ten inches or so), exposing joint 201 in the manhole as shown. The joint is then disassembled by removal of pin 325, drill string 13 is withdrawn with adapter 222 attached, and impactor 211 is lifted out of manhole 319 through opening 341 by a winch or the like. This greatly facilitates use of the bursting system in urban areas where sewer lines connected to manholes require bursting and replacement.

Figure 19:
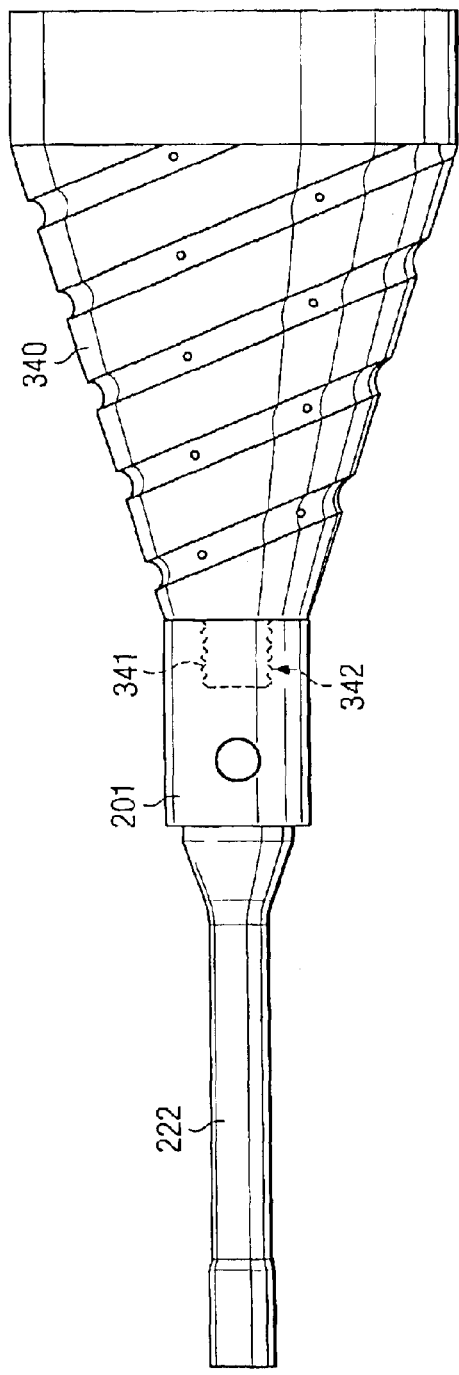
FIG. 19 is a side view of a back reamer provided with a ball joint according to the invention.
Figure 20:
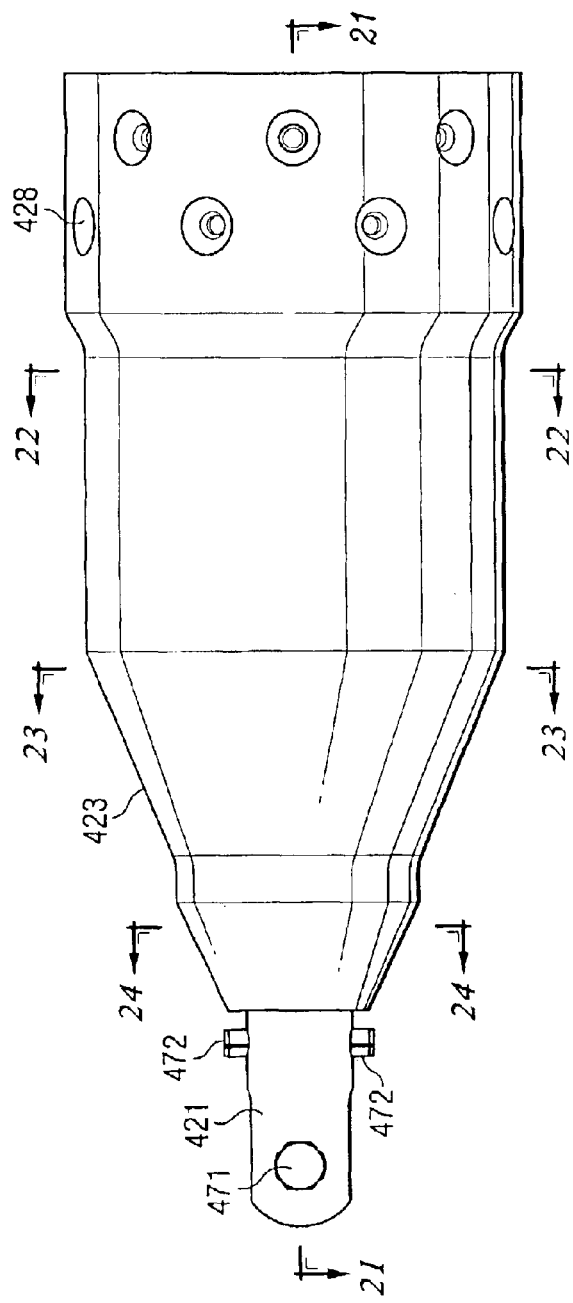
FIG. 20 is a side view of an alternative impactor according to the invention which can be pulled by a cable or chain.
Figure 25:
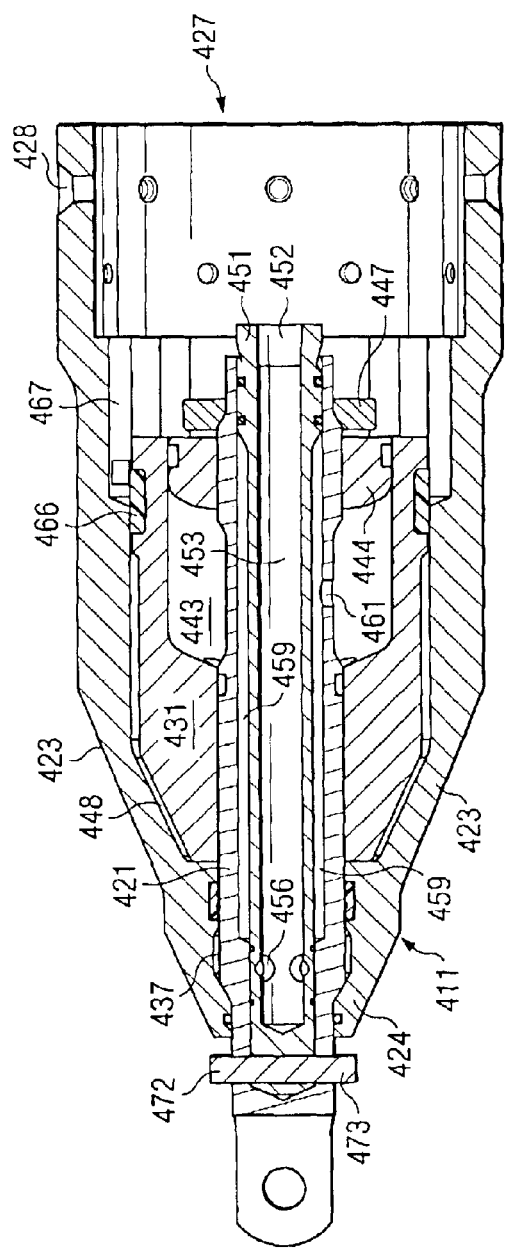
FIG. 25 is a lengthwise sectional view of the impactor of FIG. 20, at a 90 degree angle to FIG. 21.

Ball joint 201 has a substantial diameter and is generally usable only where the inner diameter of the existing pipeline is relative large, i.e., at least larger than the outer diameter of the ball joint. However, a second smaller expander can be positioned ahead of joint 201 to provide it with sufficient clearance. Similarly, a ball joint of the invention could also be used to connect a back reamer of similar shape to head 223 to a drill string, but without an internal impactor, for use in backreaming to widen an existing hole. For example, as shown in FIG. 19, adapter 222 and ball joint 201 are mounted in front of a conventional back reamer 340 by means of a threaded projection 341 at the front of reamer 340 that is secured in a threaded opening 342 at the rear end of ball joint 201. In a double back reamer assembly where a first, smaller diameter back reamer is connected to the drill string and a second, larger diameter back reamer is connected to the rear of the first one, the ball joint of the invention can be provided as the means for connecting the second reamer to the back of the first, so that the double reamer system would be able bend along its length when necessary.

FIGS. 20–26 illustrate a further embodiment of a pull-to-run impactor 411 according to the invention which has elements in common with prior embodiments. Central air inlet tube 421, bursting head 423, tube 421, shoulder 424, step 426, rear end opening 427, radial holes 428, striker 431, anvil surface 432, annular groove 437, rear pressure chamber 443, sleeve 444, rearwardly opening recess 445, seal 446, cover plate 447, front pressure chamber 448 and bolts 449 are essentially the same as described above using the corresponding reference numerals 211–249 respectively, except as otherwise noted. Impactor 411 is designed to be pulled by a cable or chain rather than a string of rods, and as such receives compressed air through a hose that runs inside the replacement pipe and conducts compressed air to a rear end opening 452 of a second, inner inlet tube 451 disposed inside of and coaxially with tube 421. For this purpose, cover plate 431 has a central hole 450 therein through which inner and outer tubes 421, 451 extend. Compressed air or other pressure fluid flows forwardly through a flow passage 453 which is the interior of tube 451 to radial holes 456 near the front end of tube 421 which holes communicate with aligned holes 457 in outer tube 421.

When in the position shown in FIG. 21-25 with the pull to run valve open, compressed air enters groove 437 and flows back through passages 458 in outer tube 421 that communicate with an annular flow passage 459 rearwardly of holes 456, 457 and between tubes 421 and 451. The compressed air passageway, which has essentially doubled back on itself, then leads out through rear radial ports 461 in outer tube 421 and into rear pressure chamber 443. At this point compressed air can flow forwardly past seal 462 through grooves 463 and into annular passage 464 in the same manner as described above for passage 302 and groove 306, initiating rearward movement of striker 431. Exhausting of the front pressure chamber 448 occurs when the front ends of rear seals 466 on striker 431 move past the front ends of exhaust grooves 467.

Figure 26:
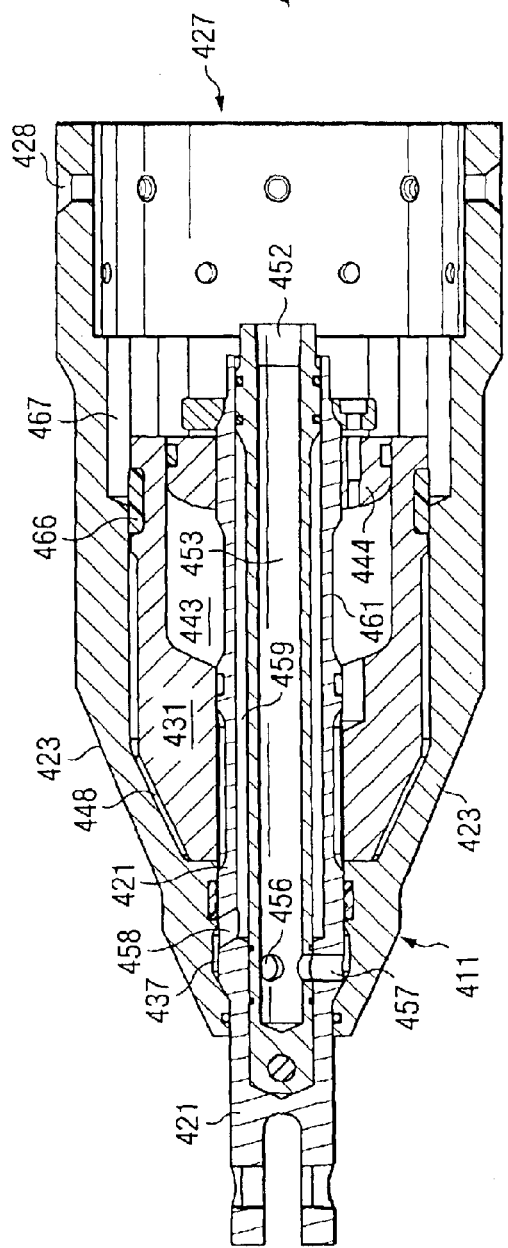
FIG. 26 is the same view as FIG. 21, but showing the valve in a closed position.

The resulting rearrangement permits use of a rear compressed air supply in combination with a front valve that remains open when a pulling force is applied but closes to the position shown in FIG. 26 when the pulling force is released. For purposes of attachment, a front end portion of outer tube 421 has a suitable connecting portion, such as a clevis 471, for connecting a cable. A press-fit pin 472 may be inserted through aligned transverse holes in inner and outer tubes 421, 451 to hold the tubes together. Protruding ends 473 of pin 472 can act as a stop defining the frontmost position of the head 423. As shown in FIG. 26, the valve as it closes chokes off the supply of compressed air gradually, and in some cases the valve may not close completely, allowing the tool to continue to run at low power.

According to a further aspect of the invention, a cable-operated static bursting system is provided substantially as described in Carter et al. PCT Publication WO 98/30350 and U.S. Pat. No. 6,305,880, Issued Oct. 23, 2001, the entire contents of which applications are incorporated by reference herein. An impactor 411 of the invention is substituted for the mole described, with the air supply hose running back through the plastic replacement pipe.

Figure 27:
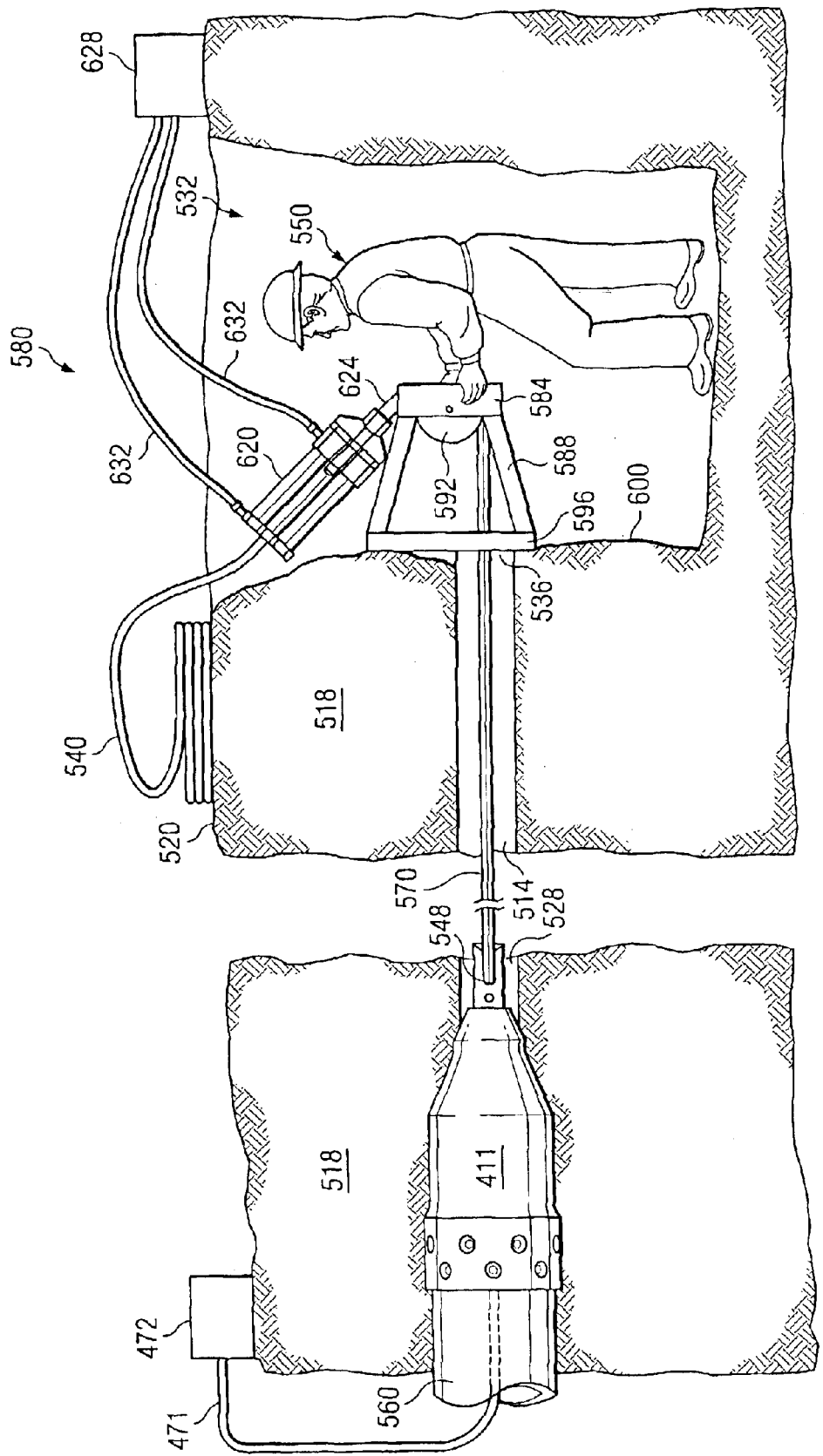
FIG. 27 is a schematic diagram of a further method of the invention using the impactor of FIGS. 20–26.

Referring to FIG. 27, an existing burstable pipe 514 is in the ground 518 below the surface 520. An entry first hole (not shown) is dug to expose a first end of pipe 514, and a second hole or exit pit 532 is dug exposing the second or exit end 536 of pipe 514. Impactor 411 is inserted nose first into the first end of pipe 514. A length of replacement pipe 560 is attached to the rear end of impactor 411 using screws as described above. Impactor 411 is also connected to a flexible compressed air hose 471 running through the inside of replacement pipe 560 which supplies compressed air from a compressor 472 located on the surface near the entry pit. A mole pulling cable 570 is passed through existing pipeline 514 and secured to clevis 471 by a pin or bolt.

In many cases, cable 570 is made of braided steel strands and is stiff enough to be fed through existing pipeline 560 manually prior to the start of the run. In other instances, especially in sewer or water lines wherein the inside of the pipe may be partially clogged with deposits, the cable 570 can be fed by attaching it to a suitable guide, such as a fiberglass rod or plumbing snake, if necessary with an auger-like action if needed to clear a path for the cable, and feeding the guide through the pipeline 514 from the exit pit to the entry pit. The guide is then withdrawn and the cable 570 may be attached to impactor 411.

A cable pulling system 580 is disposed in the exit pit 532. System 580 includes a pulling frame 584 having legs 588 and a cable pulley 592 attached thereto. A reaction plate 596 is placed against a side wall 600 of the hole 532 to provide a secure reaction surface. Cable 570 passes through a slot in plate 596 and around pulley 592 to a cable pulling device 620. Cable pulling device 620 is removably mounted in a slotted mounting annulus 624 that has been secured to frame 584. Device 620 is preferably a dual-cylinder hydraulic cable puller equipped with collets operatively connected to the cylinders for pulling the cable a short distance per stroke. A second set of collets is provided inside of annulus 624 to hold the cable 570 in tension between strokes. Such a system is sold commercially by TRIC Trenchless Ltd. The cylinders of device 620 are connected to a hydraulic pump 628 by a pair of hydraulic lines 632. In the alternative, for jobs requiring less pulling force, the cylinders of device 620 can be pneumatic cylinders connected by hoses to an air compressor that takes the place of pump 628.

The described hydraulic system pulls the impactor 411 in a series of intermittent strokes. Between strokes, various different means such as collets or clamping jaws can be used to hold the cable in tension. As such, impactor 411 may continue to run for a short time after the stroke is done, but will stop or diminish in power once the bursting head is pushed forward relative to the tube connected to the cable, which is no longer subject to a constant pulling force. This is useful in that it conserves compressed air and prevents the tool from overrunning the cable between strokes, possible resulting in the cable becoming tangled. The pull-to-run valve of the invention also makes restarting the tool when it is far underground much easier in comparison to a valve located on the surface near the air compressor.

FIGS. 28 to 34 illustrate a further embodiment of the invention wherein the air flow is modified so that the primary air supply passage, rather than being closed off when the pulling force on the drill string is relaxed, exhausts to the atmosphere instead. This embodiment also has a different valve structure that provides a large volume of air flow in a relatively short impactor. The described impactor 711 receives compressed air from the drill string, but could be modified to be pulled by a chain or cable and receive compressed air from a hose connected to its rear end.

FIGS. 28-32 show the impactor 711 in its normal operating mode, with a pulling force exerted on the drill string. Impactor 711 includes a central air inlet tube 721 that may be connected directly the terminal end of a drill string. A conical shell or bursting head 723, which acts as the housing for the impact mechanism, is mounted on the outside of tube 721 in close sliding contact therewith as in preceding embodiments. A shoulder 724 of to an enlarged outer diameter front portion 720 of tube 721 engages a slanted step 726 on the inner surface of head 723 so that pulling the drill string pulls head 723 forward into contact with the existing pipeline or borehole. However, unlike in earlier embodiments, enlarged diameter front portion 720 does not incorporate valving passages. The replacement pipe fits into a rear end opening 727 in head 723 and is secured therein by fasteners such as screws inserted through radial holes 728 through a rear cylindrical portion of head 723. A striker 731 is mounted at its front end on the outer surface of tube 721 rearwardly of head 723. During operation, a pressure fluid such as compressed air fed through tube 721 is used to reciprocate striker 731, causing it to deliver rapid impacts to head 723. For this purpose, compressed air is fed from machine 12 through drill string 13 and into tube 721. Tube 721 has an inner central flow passage 733 that leads to a series of three equiangular radial valve holes 734 and is sealed at its rear end by a central portion of a cap 742.

Compressed air is directed into a rear pressure chamber 743 formed by a rearwardly opening recess in striker 731 and a sleeve 744 secured on tube 721. Sleeve 744 in this embodiment comprises a hollow cylinder. Holes 734 open inside of sleeve 744 and compressed air enters chamber 743 through a circular formation of equiangularly spaced air passages 745 in the front of sleeve 744. Cap 742 is secured by bolts to a plug 749 that seals the rear end of sleeve 744. A seal 746 mounted in an annular groove on the outside of sleeve 744 is in sliding, sealed engagement with the inner surface of the rear opening in striker 731.

An annular passage 802 extending frontwardly between the outside of tube 721 and the inside of striker 731 conducts compressed air to a front variable volume pressure chamber 748. A rear, enlarged diameter portion 803 of tube 721, preferably provided with a sealing ring 804, sealingly engages the inside of head 723 to seal off passage 802 at certain times in the impact cycle. A rearwardly-opening counterbore or a number of parallel grooves 806 in the wall of passage 802 which act as bypass passages permitting compressed air to flow past enlarged portion 803 when the striker has delivered its impact as shown in FIGS. 29 and 30, causing the striker to move rearwardly. Front chamber 748 becomes isolated from rear chamber 743 when portion 803 reaches the front end of grooves 806.

Figure 32:
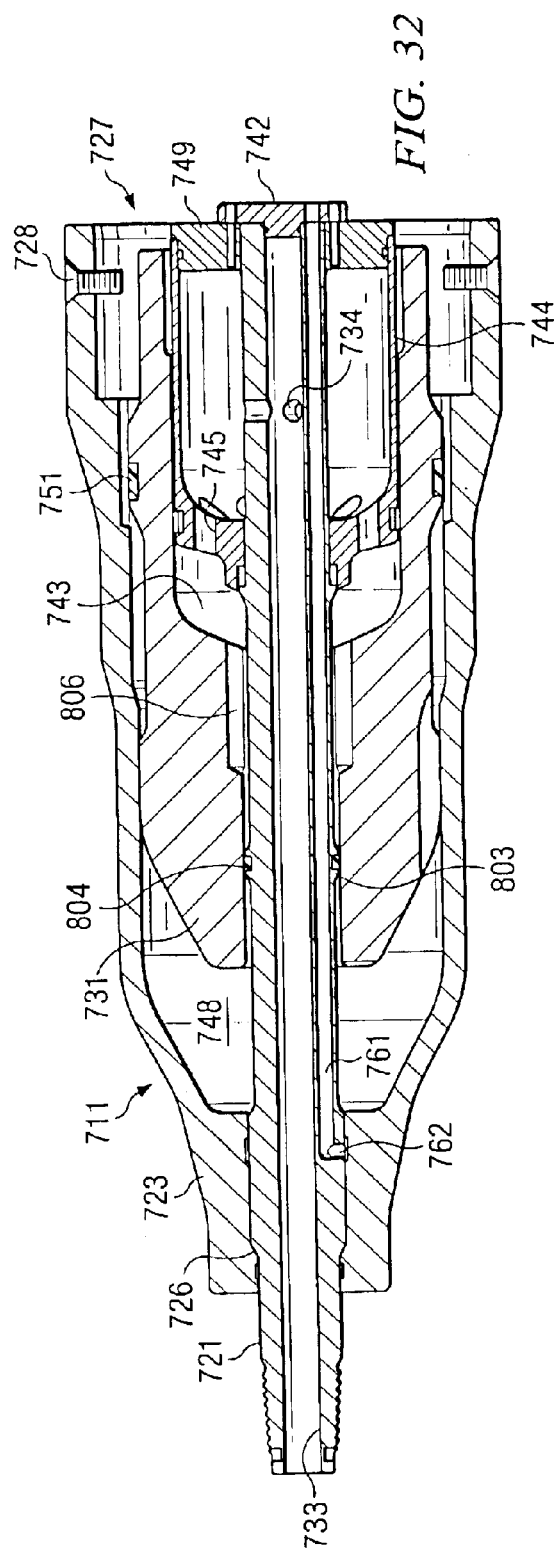
FIG. 32 is the same view as FIG. 30, taken with the striker in a retracted position.

The front pressure chamber exhausts when a rear annular seal 751 on the outside of the striker clears one or more lengthwise exhaust passages 807 machined on the inside of head 723 as shown in FIGS. 31 and 32. The pressure in rear pressure chamber 743 then becomes greater than the pressure in front chamber 748, and the impact cycle repeats.

Figure 33:
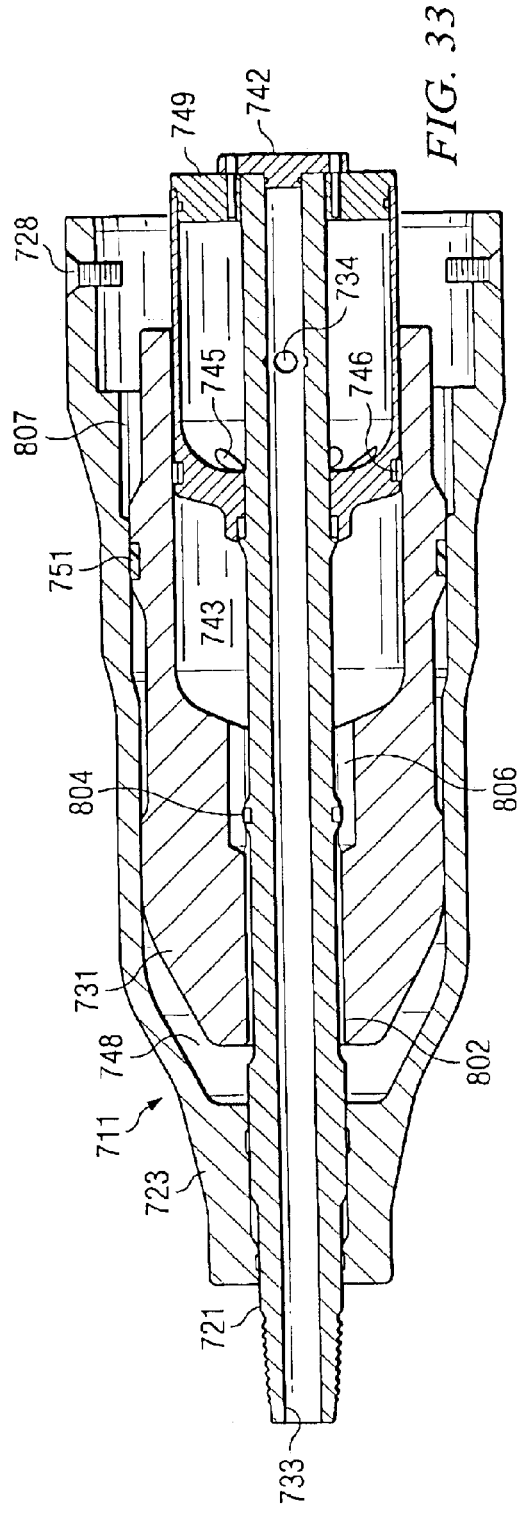
FIG. 33 is the same view as FIG. 29, taken with the valve in an off position.
Figure 34:
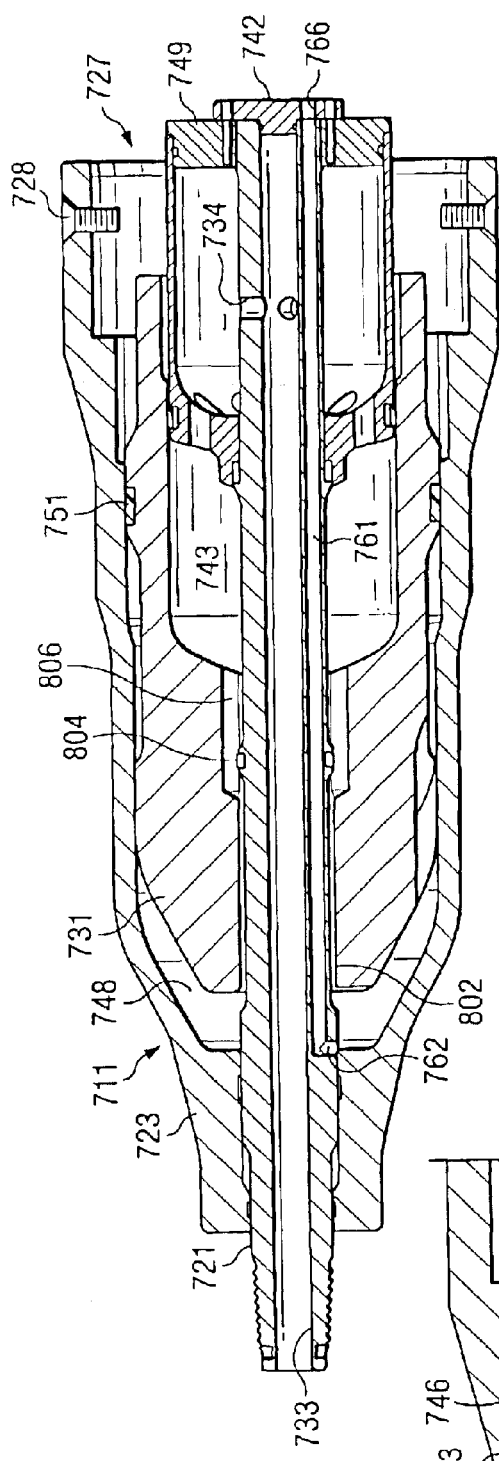
FIG. 34 is the same view as FIG. 30, taken with the valve in an off position.

The striker continues to reciprocate in this manner until tension is relaxed on the drill string, which causes tube 721 to move rearwardly relative to head 723. Tube 721 has a number of flow passages 761 that open on enlarged diameter portion 720 and remain covered by the inner surface of head 723 (or a seal bearing set therein) during normal operation. Following rearward movement of tube 721, the radial openings 762 of these passages 761 become uncovered as shown in FIGS. 33 and 34. Compressed air from front chamber 748 then vents to the atmosphere, and air from rear pressure chamber 743 flows along passages 802 and is also vented to the atmosphere through passages 761, which are aligned with corresponding holes 766 in cap 742.

While striker 731 in its forwardmost position could seal off passages 802 by sliding entirely over enlarged diameter front portion 720, in practice it does not do so. Striker 731, acted on by compressed air on both sides and still in motion from the previous cycle, moves to a position where the forces acting on it are equal on both sides. For this purpose it is important that part of enlarged diameter front portion 720 extend rearwardly from opening 762. The size of the opening between enlarged diameter portion 720 and striker 731 at the end of passage 802 is regulated by the striker's position and varies the amount of pressure on each side of the striker. In this manner the striker stops in a suitable position to resume cycling once enlarged diameter portion 720 is pulled forward to cover openings 762 again.

Enlarged diameter front portion 720 of tube 721 again acts as a valve member for stopping the striker, but does so in a manner that does not cut off the flow of compressed air through the tool. This permits the overall length of the tool to be substantially reduced because, among other reasons, enlarged diameter front portion 720 can be shorter than in prior embodiments wherein angled inlet and outlet passages are provided in order to cut off air flow. The shortened tool is more useful when the impactor must be removed from a manhole having a narrow top opening as discussed above, and it may be possible to remove the shortened tool without need for a front ball joint.

Figure 35:
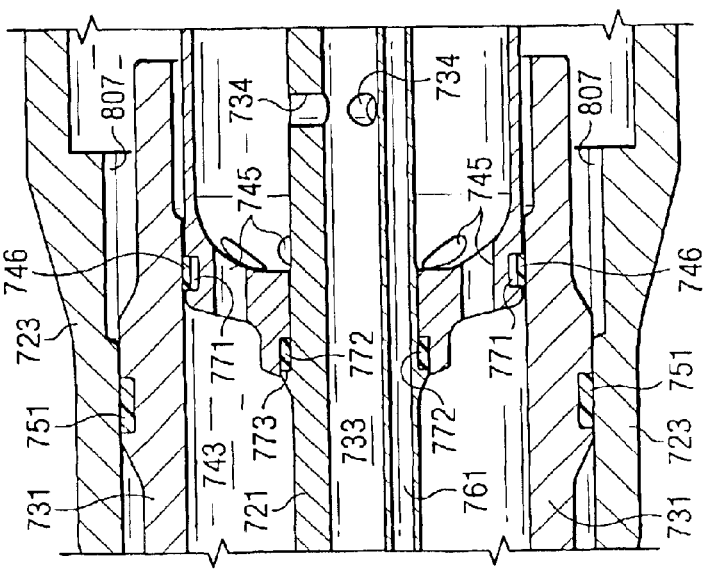
FIG. 35 is an enlarged view of a midportion of FIG. 34.

According to a further aspect of the invention, it has been found that the metal on metal contact between striker 731 and sleeve 744 is a frequent cause of binding and failure unless steps are taken to ensure a looser but sealing fit. As illustrated in detail in FIG. 35, seal 746 comprises a Teflon ring that is slightly larger than a groove 771 into which it fits, with a slight clearance beneath (0.03 inch in the embodiment shown.) A similar slight clearance is provided between the outside of sleeve 744 and the inside of striker 731 to prevent binding. Seal 746 fits into groove 771 loosely enough to accommodate small changes of position of striker 731 relative to sleeve 744 in the radial direction, but is large enough to prevent leakage through the clearance therebetween. The use of an oversize seal ring and a groove with clearance beneath the seal ring, permitting some degree of movement by seal 746, prevents binding and permits use of a relatively long sleeve 744. The front seal ring 804 is preferably a Teflon ring mounted in the same manner. An elastomeric shock absorbing ring 772 is also provided between a shoulder 773 of tube 721 and the front of sleeve 744 to dampen shocks to tube 721.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims. A number of aspects of the invention have wide applicability and can be used in other types of pneumatic impact tools, such self-propelled impact ground piercing tools. "Pressure fluid" should be understood to include compressed air and other forms of pressure fluids that could be used for a like purpose, such as other gases or liquids.

What is claimed is:

1. An impactor, comprising:
    a head having a rearwardly opening recess and a front end opening that communicates with the recess;
    an inlet pipe connectable at its front end to a pulling device and extending into the recess of the head through the front end opening, and having a pulling connection by which the impactor can be pulled while the striker is delivering impacts against the head in the same direction as a pulling force exerted by the pulling device;
    a striker mounted for sliding movement along the inlet pipe;
    a distributing mechanism which receives pressure fluid supplied through the inlet pipe to cause the striker to reciprocate in the rearwardly opening recess of the head to deliver forward impacts against the head; and
    a valve which regulates supply of pressure fluid to the distributing mechanism, including a front portion of the inlet pipe which assumes a first position in response to pulling force exerted on the inlet pipe by the pulling device that causes the distributing mechanism to reciprocate the striker, and a second position in which relaxing of the pulling force on the inlet pipe causes the distributing mechanism to cease reciprocating the striker, and a passage that permits pressure fluid in the inlet pipe to exhaust to the atmosphere when the valve is in the second position.

2. The impactor of claim 1, further comprising means for moving the inlet pipe towards the second position when the pulling force on the inlet pipe is relaxed.

3. The impactor of claim 1, wherein the distributing mechanism further comprises a front pressure chamber in front of the striker and a rear pressure chamber behind the striker, and the passage that permits pressure fluid in the inlet tube to exhaust to the atmosphere when the valve is in the second position comprises a lengthwise passage that opens at a rear end portion of the inlet tube and extends forwardly to communicate with a radial port that is covered by the head in the first position and uncovered in the second position, such that pressure fluid from the inlet pipe flows from the front pressure chamber through the radial port into the passage.

4. The impactor of claim 3, wherein pressure fluid from the inlet pipe flows through a central flow passage and at least one radial hole in the inlet pipe into the rear pressure chamber, and from the rear pressure chamber through an annular opening between the striker and head into the front pressure chamber.

5. The impactor of claim 4, wherein the passage that permits pressure fluid in the inlet pipe to exhaust to the atmosphere when the valve is in the second position is formed in a wall of the inlet pipe and runs in parallel with the central flow passage.

6. The impactor of claim 4, further comprising a sleeve mounted on the inlet tube, and the striker has a rearwardly opening recess in which the sleeve is in sliding, sealing contact, whereby the sleeve and the striker cooperate to form the rear pressure chamber, and the inlet tube further comprises at least one radial hole that opens inside the sleeve and wherein the sleeve includes at least one passage communicating with the rear pressure chamber such that pressure fluid flows through the radial hole into the rear pressure chamber.

7. The impactor of claim 1, further comprising a sleeve slidably disposed in a rearwardly opening recess in the striker with an external surface of the sleeve having an annular groove therein with a seal bearing disposed in the groove, the seal bearing being oversized relative to the groove such that an annular space exists beneath the seal bearing at the bottom of the groove, and an outer portion of the seal bearing extends from the groove to form a seal between the external surface of the sleeve and the recess of the striker.

8. The impactor of claim 1, wherein the head is slidably mounted on the inlet pipe and moves forward relative to the inlet pipe and drill string in response to an impact of the striker against the head when the inlet tube is in the first position.

9. The impactor of claim 8, wherein a front portion of the inlet pipe comprises an enlarged diameter portion which engages a shoulder on the head when the inlet valve is in the first position.

10. The impactor of claim 1, wherein the impactor further comprises means for pulling a replacement pipe along behind the head.

11. The impactor of claim 1, wherein the head has a frontwardly tapering external surface suitable for pipe bursting.

12. A pneumatic impact mechanism, comprising:
an elongated head including a tubular housing; a striker disposed for reciprocation within an internal chamber of the housing to impart impacts to a rear impact surface of the head for driving the impact mechanism forwardly through the ground; and
an air distributing mechanism disposed for effecting reciprocation of the striker, including a sleeve slidably disposed in a rearwardly opening recess in the striker with the external surface of the sleeve separated from the rearwardly opening recess of the striker by a slight clearance, wherein an external surface of the sleeve has an annular groove therein with a seal bearing disposed in the groove, which seal bearing is oversized relative to the groove such that an annular space exists beneath the seal bearing at the bottom of the groove, and an outer portion of the seal bearing protrudes from the groove into sliding, sealing contact with the recess of the striker.

* * * * *